United States Patent
Waterman et al.

(10) Patent No.: US 12,487,829 B2
(45) Date of Patent: Dec. 2, 2025

(54) MACRO-OP FUSION FOR PIPELINED ARCHITECTURES

(71) Applicant: SiFive, Inc., San Mateo, CA (US)

(72) Inventors: Andrew Waterman, Berkeley, CA (US); Krste Asanovic, Oakland, CA (US); Josh Smith, San Francisco, CA (US)

(73) Assignee: SiFive, Inc., Santa Clara, CA (US)

( * ) Notice: Subject to any disclaimer, the term of this patent is extended or adjusted under 35 U.S.C. 154(b) by 16 days.

(21) Appl. No.: 18/428,319

(22) Filed: Jan. 31, 2024

(65) Prior Publication Data

US 2024/0264839 A1    Aug. 8, 2024

Related U.S. Application Data

(60) Provisional application No. 63/443,350, filed on Feb. 3, 2023.

(51) Int. Cl.
*G06F 9/30* (2018.01)
*G06F 9/24* (2006.01)
*G06F 9/38* (2018.01)

(52) U.S. Cl.
CPC ............. *G06F 9/3806* (2013.01); *G06F 9/24* (2013.01)

(58) Field of Classification Search
CPC ............. G06F 9/30145; G06F 9/3017; G06F 9/30181; G06F 9/3812; G06F 9/3814; G06F 9/3818; G06F 9/3842; G06F 9/3853
See application file for complete search history.

(56) References Cited

U.S. PATENT DOCUMENTS

| | | | |
|---|---|---|---|
| 5,101,344 A | 3/1992 | Bonet et al. | |
| 5,471,593 A | 11/1995 | Branigin | |
| 5,742,783 A | 4/1998 | Azmoodeh et al. | |
| 6,014,742 A | 1/2000 | Krick et al. | |
| 6,349,383 B1 * | 2/2002 | Col | G06F 9/3004 712/E9.046 |
| 6,647,489 B1 * | 11/2003 | Col | G06F 9/30058 712/226 |
| 6,675,376 B2 | 1/2004 | Ronen et al. | |

(Continued)

FOREIGN PATENT DOCUMENTS

| KR | 10-2017-0097633 A | 8/2017 |
|---|---|---|
| KR | 10-20170095163 A | 8/2017 |

OTHER PUBLICATIONS

Exploring Early and Late ALUs for Single-Issue In-Order Pipelines; Alen Bardizbanyan and Per Larsson-Edefors; Chalmers University of Technology, Gothenburg, Sweden; 2015; 6 pages.

(Continued)

*Primary Examiner* — Jacob Petranek
(74) *Attorney, Agent, or Firm* — Kilpatrick Townsend & Stockton LLP

(57) ABSTRACT

Systems and methods are disclosed for macro-op fusion in pipelined architectures. For example, some methods include detecting a sequence of macro-ops stored in an instruction decode buffer, the sequence of macro-ops including a first macro-op, followed by one or more intervening macro-ops, followed by a last macro-op; determining a micro-op that is equivalent to the first macro-op combined with the last macro-op; and forwarding the micro-op to one or more execution resource circuitries for execution.

20 Claims, 11 Drawing Sheets

(56) References Cited

U.S. PATENT DOCUMENTS

| | | |
|---|---|---|
| 2004/0153630 A1 | 8/2004 | Henry et al. |
| 2007/0260855 A1 | 11/2007 | Gschwind et al. |
| 2009/0089578 A1 | 4/2009 | King et al. |
| 2010/0115248 A1* | 5/2010 | Ouziel .................. G06F 9/3016 712/226 |
| 2011/0264891 A1* | 10/2011 | Parks .................... G06F 9/3854 712/E9.023 |
| 2014/0281389 A1 | 9/2014 | Loktyukhin et al. |
| 2016/0104011 A1 | 4/2016 | Henry et al. |
| 2016/0179542 A1 | 6/2016 | Lai et al. |
| 2017/0161067 A1 | 6/2017 | Henry et al. |
| 2017/0177343 A1* | 6/2017 | Lai ........................ G06F 9/3016 |
| 2018/0095752 A1 | 4/2018 | Kudaravalli et al. |
| 2018/0129501 A1 | 5/2018 | Levison et al. |
| 2019/0286443 A1 | 9/2019 | Solomatnikov et al. |
| 2021/0255859 A1* | 8/2021 | Asanovic ............ G06F 9/30181 |

OTHER PUBLICATIONS

Microprocessor Report; SiFive Raises Risc-V Performance; Series 7 Comprises First Superscalar RISC-V CPUs; By Bob Wheeler; Nov. 12, 2018; 3 pages.

Algorithm Flattening; Complete branch elimination for GPU requires a paradigm shift from CPU thinking; Lucas Vespa, Alexander Bauman, Jenny Wells; 2015; 6 pages.

"The T9000 Transputer Hardware Reference Maual"; 1st edition; INMOS transputer databook series, SGS-Thompson Microelectronics, 1993; 356 pages.

Celio, et al.; "The Renewed Case for the Reduced Unstruction Set Computer: Avoiding ISA Bloat with Macro-Op Fusion for RISC-V"; Dept. of Electrical Engineering & Computer Sciences, University of California, Berkeley, Jul. 8, 2016; 16 pages.

* cited by examiner

MACRO-OP FUSION FOR PIPELINED ARCHITECTURES

CROSS-REFERENCE TO RELATED APPLICATION(S)

This application claims priority to and the benefit of U.S. Provisional Patent Application Ser. No. 63/443,350, filed Feb. 3, 2023, the entire disclosure of which is hereby incorporated by reference.

TECHNICAL FIELD

This disclosure relates to macro-op fusion for pipelined architectures.

BACKGROUND

Processors sometimes perform macro-op fusion, where several Instruction Set Architecture (ISA) instructions are fused in the decode stage and handled as one internal operation. Macro-op fusion is a powerful technique to lower effective instruction count. Recent research into this issue, specifically in the context of RISC-V architectures, has identified a limited set of areas where macro-op fusion can avoid instruction set complexities. See, e.g. "The Renewed Case for the Reduced Instruction Set Computer: Avoiding ISA Bloat with Macro-Op Fusion for RISC-V" by Christopher Celio, et. al., 8 Jul. 2016, arXiv: 1607.02318 [cs.AR]. However, that paper's approach does not contemplate a number of macro-op fusion opportunities that can increase efficiency. Intel has done work with fused instructions, such as that described in U.S. Pat. No. 6,675,376. Earlier work includes the T9000 Transputer by Inmos, as described in "the T9000 Transputer Hardware Reference Manual", Inmos, 1$^{st}$ Edition, 1993.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Overview

Figure 1:
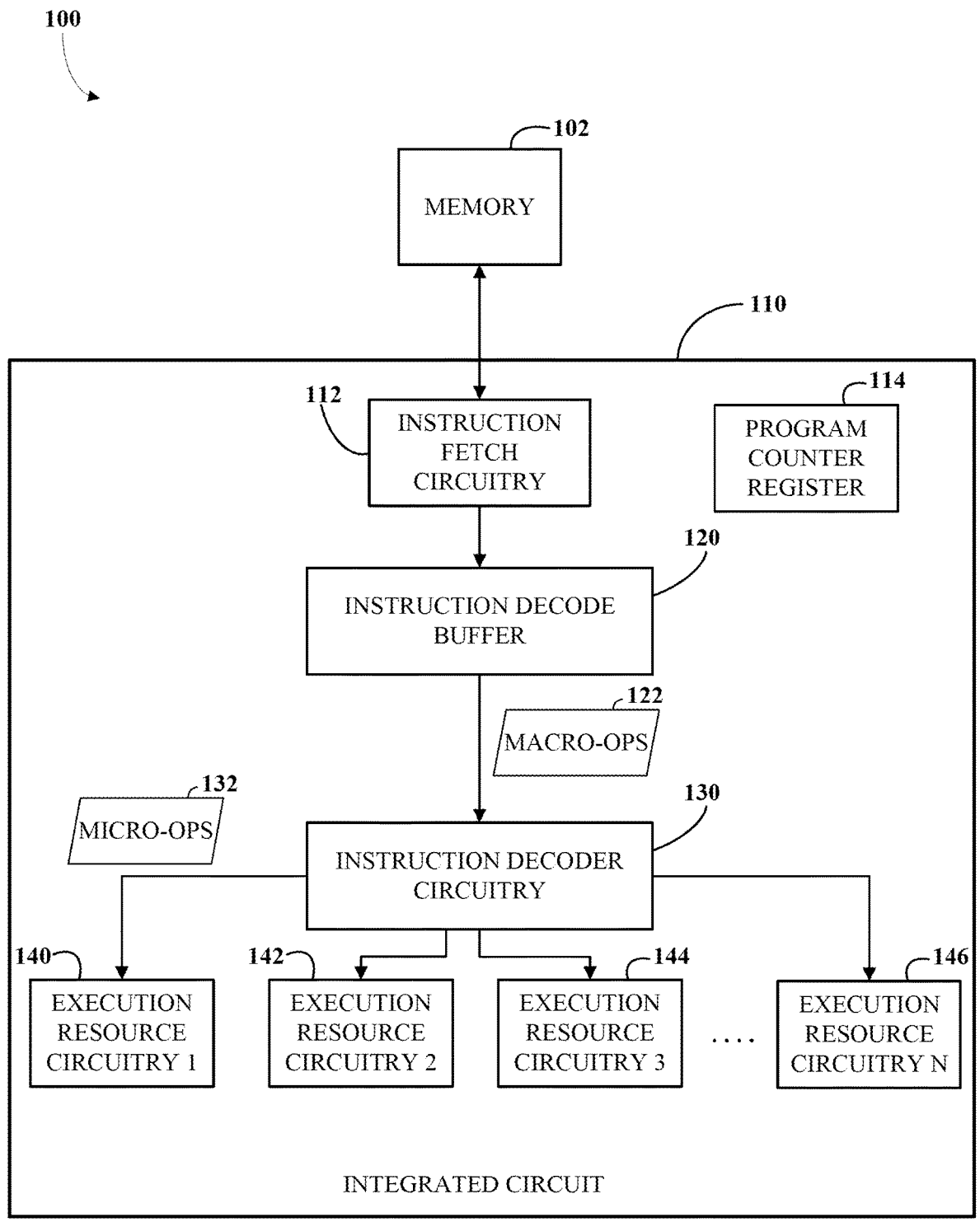
FIG. 1 is a block diagram of an example of a system for executing instructions from an instruction set with macro-op fusion.

Systems and methods for macro-op fusion are disclosed. An integrated circuit (e.g., a processor or microcontroller) may decode and execute macro-op instructions of an instruction set architecture (ISA) (e.g., a RISC V instruction set). A multiple macro-ops from a sequence of macro-ops decoded by the integrated circuit may be fused (i.e., combined) into a single equivalent micro-op that is executed by the integrated circuit. In some implementations, a first macro-op and a last macro-op from a sequence including one or more intervening macro-ops, occurring between the first macro-op and the last macro-op in a program order, are fused into a micro-op equivalent to the first macro-op and the last macro-op. For example, a system may, as a condition for performing fusion, check that the last macro-op is independent of the one or more intervening macro-ops. For example, an in-order processor may, as a condition for performing fusion, check that the one or more intervening macro-ops can be issued in a same clock cycle as the micro-op. Performance may be improved and/or circuit area may be reduced by reducing processor pipeline resources (e.g., reorder buffer entries) consumed to execute the first macro-op and last macro-op.

In some implementations, dependent macro-ops may be fused into a micro-op, where the resulting micro-op uses two execution resource circuitries (e.g., the early ALU and the late ALU) in a same pipeline branch. For example, the micro-op may be executed by both an early execution resource circuitry and a late execution resource circuitry that takes output from the early execution resource circuitry as input. In some implementations, a single micro-op targets multiple parallel pipeline branches.

In some conventional processors, a conditional branch would be predicted, and if predicted as taken, would normally initiate a pipeline flush. If the taken prediction was wrong, the pipeline would be flushed again to restart on a sequential path. If the conditional branch was predicted not-taken, but was actually taken, the pipeline would also be flushed. Only if the conditional branch was predicted not-taken and the branch was actually not-taken is the pipeline flush avoided. TABLE 1 below shows the number of pipeline flushes that may be carried out by a conventional processor using branch prediction.

TABLE 1

| Predicted | Actual | # Pipeline flushes |
|---|---|---|
| T | T | 1 |
| T | N | 2 |
| N | T | 1 |
| N | N | 0 |

In some cases, where the branch may be difficult to predict, the branch can not only cause many pipeline flushes but can pollute the branch predictor, reducing performance for other predictable branches.

In some implementations, a dynamic fusion predictor may be used to facilitate macro-op fusion across instruction fetch boundaries in an instruction decode buffer. As instructions are fetched into the instruction decode buffer, there may be situations where the prefix of a potentially fusible sequence is present in the fetch buffer but the processor will have to wait to fetch additional instructions from memory before knowing for certain whether there is a fusible sequence. In some situations it may be beneficial to send the existing buffered prefix instructions into execution, while in other situations it may be beneficial to wait for the remaining instructions in the fusible sequence to be fetched and then fused with the buffered instructions. In general, there could be a performance or power advantage to either eagerly executing the prefix or waiting for the trailing instructions. A fixed policy may result in suboptimal performance.

For example, a dynamic "beneficial fusion" predictor may be utilized to inform the processor whether to delay executing the current instruction, or instructions, in the fetch buffer and to wait until additional instructions are fetched. In some implementations, the fusion predictor is only consulted and updated if one or more of the buffered instructions in the potential fusion sequence could have been sent into execution (i.e., execution resources were available), otherwise, the predictor is neither consulted nor updated.

For example, the fusion predictor entries can be indexed and/or tagged using one of many forms, such as, indexed by a program counter; indexed by hash of a current program counter and a program counter history; tagged, where each entry is tagged with a program counter; or tagless, where each entry is used without considering the program counter. For example, a program counter used to index the fusion predictor can be that used to fetch the last group of instructions, or the program counter of the potential fusion prefix, or the program counter of the next group to be fetched. For example, the entries in the fusion predictor might contain K-bit counters (K>=1) to provide hysteresis. The system may execute instruction sequences correctly regardless of the prediction made by the beneficial fusion predictor, and so a misprediction recovery mechanism may be omitted from the system.

A beneficial fusion predictor may be updated based on a performance model that inspects the instructions that are fetched after the potential fusion sequence to determine if waiting for these additional instructions would be beneficial. The performance model may include a number of potential components, such as: 1) Can the newly fetched instruction fuse with the buffered instructions? 2) Would fusion prevent parallel issue of instructions that follow the fusible sequence in the new fetch group? 3) Are there instructions in the new fetch group that depend on instructions in the buffered fusion prefix such that stalls are created that would have been obviated by eagerly executing the prefix instructions?

As used herein, the term "circuitry" refers to an arrangement of electronic components (e.g., transistors, resistors, capacitors, and/or inductors) that is structured to implement one or more functions. For example, a circuitry may include one or more transistors interconnected to form logic gates that collectively implement a logical function.

The term "macro-op" is used to describe an instruction held in a format described by the processor's instruction set architecture (ISA). Macro-ops are the instruction format in which software is encoded for a machine and all processors implementing the same ISA use the same encoding for macro-ops. The term "micro-op" is used to describe an internal processor-specific encoding of the operations used to control execution resources, and can vary widely between different implementations of the same ISA. In various circumstances, the correspondence between macro-ops and micro-ops used a by a processor to implement supported macro-ops may be one-to-one, one-to-many, or many-to-one. For example, a single macro-op can be cracked into one or more internal micro-ops, and multiple macro-ops can also be fused into a single internal micro-op.

Details

FIG. 1 is a block diagram of an example of a system 100 for executing instructions from an instruction set with macro-op fusion. The system 100 includes a memory 102 storing instructions and an integrated circuit 110 configured to execute the instructions. For example, the integrated circuit may be a processor or a microcontroller. The integrated circuit 110 includes an instruction fetch circuitry 112; a program counter register 114; an instruction decode buffer 120 configured to stores macro-ops 122 that have been fetched from the memory 102; an instruction decoder circuitry 130 configured to decode macro-ops from the instruction decode buffer 120 to generate corresponding micro-ops 132 that are passed to one or more execution resource circuitries (140, 142, 144, and 146) for execution. For example, the integrated circuit 110 may be configured to implement the process 600 of FIG. 6. The correspondence between macro-ops 122 and micro-ops is not always one-to-one. The instruction decoder circuitry 130 is configured to fuse certain sequences of macro-ops 122 detected in the instruction decode buffer 120, determining a single equivalent micro-op 132 for execution using the one or more execution resource circuitries (140, 142, 144, and 146).

The instruction fetch circuitry 112 is configured to fetch macro-ops from the memory 102 and store them in the instruction decode buffer 120 while the macro-ops 122 are processed by a pipelined architecture of the integrated circuit 110.

The program counter register 114 may be configured to store a pointer to a next macro-op in memory. A program counter value stored in the program counter register 114 may be updated based on the progress of execution by the integrated circuit 110. For example, when an instruction is executed the program counter may be updated to point to a next instruction to be executed. For example, the program counter may be updated by a control-flow instruction to one of multiple possible values based on a result of testing a condition. For example, the program counter may be updated to a target address.

The integrated circuit 110 includes an instruction decode buffer 120 configured to store macro-ops fetched from memory 102. For example, the instruction decode buffer 120 may have a depth (e.g., 4, 8, 12, 16, or 24 instructions) that facilitates a pipelined and/or superscalar architecture of the integrated circuit 110. The macro-ops may be members of an instruction set (e.g., a RISC V instruction set, an x86 instruction set, an ARM instruction set, or a MIPS instruction set) supported by the integrated circuit 110.

The integrated circuit 110 includes one or more execution resource circuitries (140, 142, 144, and 146) configured to execute micro-ops to support an instruction set including macro-ops. For example, the instruction set may be a RISC V instruction set. For example, the one or more execution resource circuitries (140, 142, 144, and 146) may include an adder, a shift register, a multiplier, and/or a floating point unit. The one or more execution resource circuitries (140, 142, 144, and 146) may update the state of the integrated circuit 110, including internal registers and/or flags or status bits (not explicitly shown in FIG. 1) based on results of executing a micro-op. Results of execution of a micro-op may also be written to the memory 102 (e.g., during subsequent stages of a pipelined execution).

The integrated circuit 110 includes an instruction decoder circuitry 130 configured to decode the macro-ops 122 in the instruction decode buffer 120. The instruction decode buffer 120 may convert the macro-ops into corresponding micro-ops 132 that are internally executed by the integrated circuit using the one or more execution resource circuitries (140, 142, 144, and 146). The instruction decoder circuitry 130 is configured to implement macro-op fusion, where multiple macro-ops are converted to a single micro-op for execution.

For example, the instruction decoder circuitry 130 may be configured to detect a sequence of macro-ops stored in the instruction decode buffer 120. For example, detecting the sequence of macro-ops may include detecting a sequence of opcodes as portions of the respective macro-ops. The sequence of macro-ops may include a first macro-op, followed by one or more intervening macro-ops, followed by a last macro-op. For example, the one or more intervening macro-ops may include at least two macro-ops. In some implementations, the one or more intervening macro-ops consist of a number of macro-ops equal to two less than the number of macro-ops that the instruction decode buffer 120 is sized to store.

The instruction decoder circuitry 130 may determine a micro-op that is equivalent to the first macro-op combined with the last macro-op. The instruction decoder circuitry 130 may forward the micro-op to at least one of the one or more execution resource circuitries (140, 142, 144, and 146) for execution.

The instruction decoder circuitry 130 may be configured to check conditions for fusion before determining the micro-op based on the first macro-op and the last macro-op. In some implementations, the instruction decoder circuitry 130 is configured to check that the last macro-op is independent of the one or more intervening macro-ops. In some implementations (e.g., in an in-order processor), the instruction decoder circuitry 130 is configured to check that the one or more intervening macro-ops can be issued in a same clock cycle as the micro-op resulting from fusion of the first macro-op and the last macro-op. In some implementations, the instruction decoder circuitry 130 is configured to determine a prediction of whether a delay caused by fusing the first macro-op with the last macro-op will be below a threshold, wherein the micro-op is determined responsive to the prediction indicating that the delay will be below the threshold. This prediction about the delay caused by fusion may be used to better balance the delay caused by fusion against the benefits of fusion, such as reducing a number of reorder buffer entries used. For example, the instruction decoder circuitry 130 may implement the process 700 of FIG. 7 to determine whether to fuse the first macro-op with the last macro-op. In some implementations, the last macro-op is a control flow instruction (e.g., a branch instruction or a call instruction), which may simplify checks for fusion, where the control flow macro-op may only change the value stored in the program counter register 114, while leaving the rest of the state of the processor unchanged.

The sequence of macro-ops may include a first macro-op followed by a last macro-op (i.e., with or without intervening macro-ops between the first macro-op and the last macro-op). In some implementations, the one or more execution resource circuitries (140, 142, 144, and 146) include an early execution resource circuitry and a late execution resource circuitry that is after the early execution resource circuitry in a processor pipeline (e.g., in the processor pipeline 500 of FIG. 5) and is configured to take output from the early execution resource circuitry as input, and in which the micro-op is executed by both the early execution resource circuitry and the late execution resource circuitry. In some implementations, the one or more execution resource circuitries (140, 142, 144, and 146) include a first execution resource circuitry in a first processor pipeline branch and a second execution resource circuitry in a second processor pipeline branch that operates in parallel with the first processor pipeline branch, and in which the micro-op is executed by both the first execution resource circuitry and the second execution resource circuitry.

In some implementations (not shown in FIG. 1), the memory 102 may be included in the integrated circuit 110.

Figure 2:
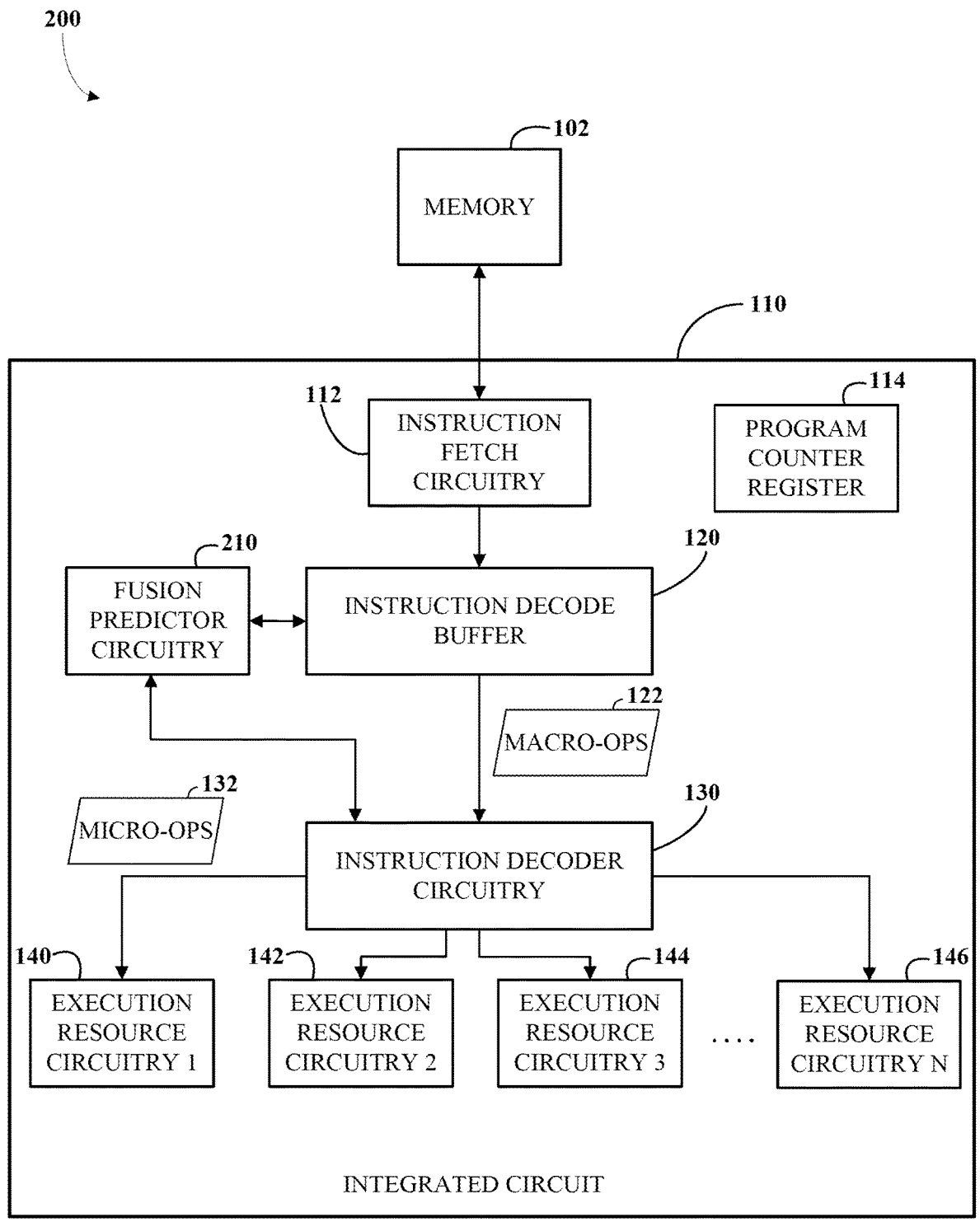
FIG. 2 is a block diagram of an example of a system for executing instructions from an instruction set with macro-op fusion with fusion prediction.

FIG. 2 is a block diagram of an example of a system 200 for executing instructions from an instruction set with macro-op fusion with fusion prediction. The system 200 is similar to the system 100 of FIG. 1, with the addition of fusion predictor circuitry 210 configured to facilitate detection and beneficial fusion of candidate sequences of macro-ops. For example, the system 200 may be used to implement the process 600 of FIG. 6. For example, the system 200 may be used to implement the process 900 of FIG. 9. For example, the fusion predictor circuitry 210 may include the fusion predictor circuitry 310 of FIG. 3.

The system 200 includes a fusion predictor circuitry 210 configured to detect a prefix of a sequence of macro-ops in the instruction decode buffer 120. For example, where the instruction decoder circuitry 130 is configured to detect a sequence of macro-op instructions consisting of instructions 1 through N (e.g., N=2, 3, 4, or 5) when it occurs in the instruction decode buffer 120, the fusion predictor circuitry 210 may be configured to detect prefixes including the one or more macro-op instructions 1 through m, where 1<=m<N, when they occur in the instruction decode buffer 120.

The fusion predictor circuitry 210 is configured to determine a prediction of whether the sequence of macro-ops will be completed in a next fetch of macro-ops from memory and fused. For example, the prediction may be determined using a table of prediction counters that is maintained by the fusion predictor circuitry 210. The prediction counters may serve as estimates of a likelihood that a prefix will be part of a sequence of macro-ops that is completed and fused. For example, the prediction counters may be K bit counters with K>1 (e.g., K=2) to provide some hysteresis. In some implementations, the table of prediction counters is indexed by a program counter stored in the program counter register 114. In some implementations, the table of prediction counters is tagged with program counter values.

Maintaining the table of prediction counters may include updating a prediction counter after a corresponding prefix is detected and the next set of instructions is fetched from memory. For example, the fusion predictor circuitry 210 may be configured to update the table of prediction counters based on whether the sequence of macro-ops is completed by the next fetch of macro-ops from memory. For example, the fusion predictor circuitry 210 may be configured to update the table of prediction counters based on whether there are instructions in the next fetch that depend on instructions in the prefix. For example, the fusion predictor circuitry 210 may be configured to update the table of prediction counters based on whether fusion would prevent parallel issue of instructions that follow the fusible sequence in the next fetch group.

The fusion predictor circuitry 210 is configured to, based on the prediction, delay execution of the prefix until after the next fetch to enable fusion of the sequence of macro-ops, or commence execution of the prefix before the next fetch and forego any possible fusion of a sequence including the prefix.

In some implementations (not shown in FIG. 2), the fusion predictor circuitry 210 is implemented as part of the instruction decoder circuitry 130.

Figure 3:
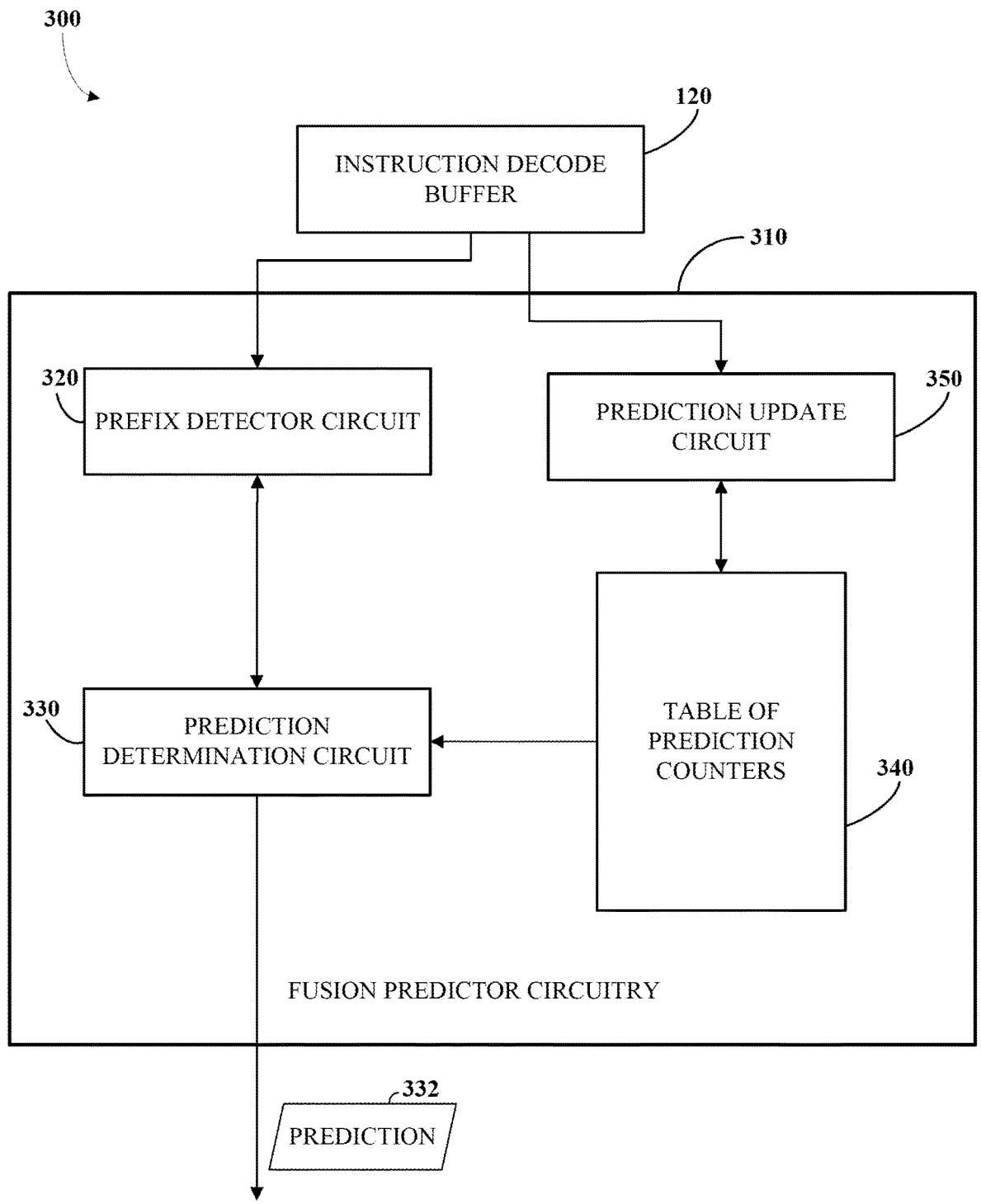
FIG. 3 is a block diagram of an example of a system for fusion prediction.

FIG. 3 is a block diagram of an example of a system 300 for fusion prediction. The system 300 includes an instruction decode buffer 120 and a fusion predictor circuitry 310. The fusion predictor circuitry 310 may be configured to examine macro-op instructions in the instruction decode buffer 120 to determine a prediction 332 of whether the sequence of macro-ops including a detected prefix will be completed in a next fetch of macro-ops from memory and fused. The fusion predictor circuitry 310 includes a prefix detector circuit 320, a prediction determination circuit 330, a table of prediction counters 340, and a prediction update circuit 350. The fusion predictor circuitry 310 may also be configured to examine macro-op instructions in the instruction decode buffer 120 to maintain a table of prediction counters 340. For example, the system 300 may be used as part of a larger system (e.g., the system 200 of FIG. 2) to implement the process 900 of FIG. 9.

The fusion predictor circuitry 310 includes a prefix detector circuit 320 that is configured to detect a prefix of a sequence of macro-ops in the instruction decode buffer 120. For example, where an instruction decoder (e.g., the instruction decoder circuitry 130) is configured to detect a sequence of macro-op instructions consisting of instructions 1 through N (e.g., N=2, 3, 4, or 5) when it occurs in the instruction decode buffer 120, the prefix detector circuit 320 may be configured to detect prefixes including the one or more macro-op instructions 1 through m, where 1<=m<N, when they occur in the instruction decode buffer 120. For example, the prefix detector circuit 320 may include a network of logic gates configured to set a flag when a sequence of m opcodes corresponding a prefix is read in the last m macro-ops stored in the instruction buffer.

The fusion predictor circuitry 310 includes a prediction determination circuit 330 that is configured to determine a prediction 332 of whether a sequence of macro-ops will be completed in a next fetch of macro-ops from memory and fused. For example, the prediction 332 may include a binary value indicating whether a fusion with the detected prefix is expected to occur after the next fetch of macro-ops. For example, the prediction 332 may include an identifier of the prefix that has been detected. The prediction 332 may be determined by looking up a corresponding prediction counter in the table of prediction counters 340, and determining the prediction based on the value of the prediction counter. The prediction counters may serve as estimates of a likelihood that a prefix will be part of a sequence of macro-ops that is completed and fused. For example, the prediction counters stored in the table of prediction counters 340 may be K bit counters with K>1 (e.g., K=2) to provide some hysteresis. For example, a prediction 332 may be determined as true if a corresponding prediction counter has a current value >=2^K (e.g., the last bit of the counter is a one), and determined as false otherwise. For example, the prediction determination circuit 330 may determine a binary portion of a prediction as the most significant bit of a corresponding K-bit prediction counter of the table of prediction counters 340.

In some implementations, the table of prediction counters 340 is indexed by a program counter. In some implementations, the table of prediction counters 340 is indexed by a hash of a program counter and program counter history. In some implementations, the table of prediction counters 340 is tagged with program counter values. For example, a program counter used to index the table of prediction counters 340 can be that used to fetch the last group of instructions, or the program counter of the potential fusion prefix, or the program counter of the next group to be fetched. In some implementations, the table of prediction counters 340 is tagless where the entries are used without considering a program counter. In some implementations, where multiple sequences of macro-ops and/or prefixes are sought for potential fusion, the table of prediction counters 340 may be tagged or indexed by an identifier of the detected prefix (e.g., a concatenation of one or more opcodes for the prefix or an index value associated with the prefix).

The fusion predictor circuitry 310 includes a prediction update circuit 350, which may be configured to maintain the table of prediction counters 340. For example, the prediction update circuit 350 may be configured to update the table of prediction counters based on whether the sequence of macro-ops is completed by the next fetch of macro-ops from memory. For example, the prediction update circuit 350 may be configured to update the table of prediction counters based on whether there are instructions in the next fetch that depend on instructions in the prefix. For example, the prediction update circuit 350 may be configured to update the table of prediction counters based on whether fusion would prevent parallel issue of instructions that follow the fusible sequence in the next fetch group. In some implementations, the table of prediction counters 340 is only consulted and updated if one or more of the buffered macro-ops of the prefix of the potential fusion sequence could have been sent into execution (i.e., execution resources were available), otherwise, the table of prediction counters 340 is neither consulted nor updated.

The fusion predictor circuitry 310 may, based on the prediction, delay execution of the prefix until after the next fetch to enable fusion of the sequence of macro-ops. For example, the delaying execution may include holding the one or more macro-ops of the prefix in a decode stage of a pipeline for multiple clock cycles.

For example, the system 300 may be part of a larger system, such as an integrated circuit (e.g., a processor or a microcontroller) for executing instructions. The instruction decode buffer 120 may be configured to store macro-ops fetched from memory. The integrated circuit may also include one or more execution resource circuitries configured to execute micro-ops to support an instruction set (e.g., a RISC V instruction set, an x86 instruction set, an ARM instruction set, or a MIPS instruction set) including macro-ops. The integrated circuit may also include an instruction decoder circuitry configured to detect the sequence of macro-ops stored in the instruction decode buffer, determine a micro-op that is equivalent to the detected sequence of macro-ops, and forward the micro-op to at least one of the one or more execution resource circuitries for execution.

Figure 4:
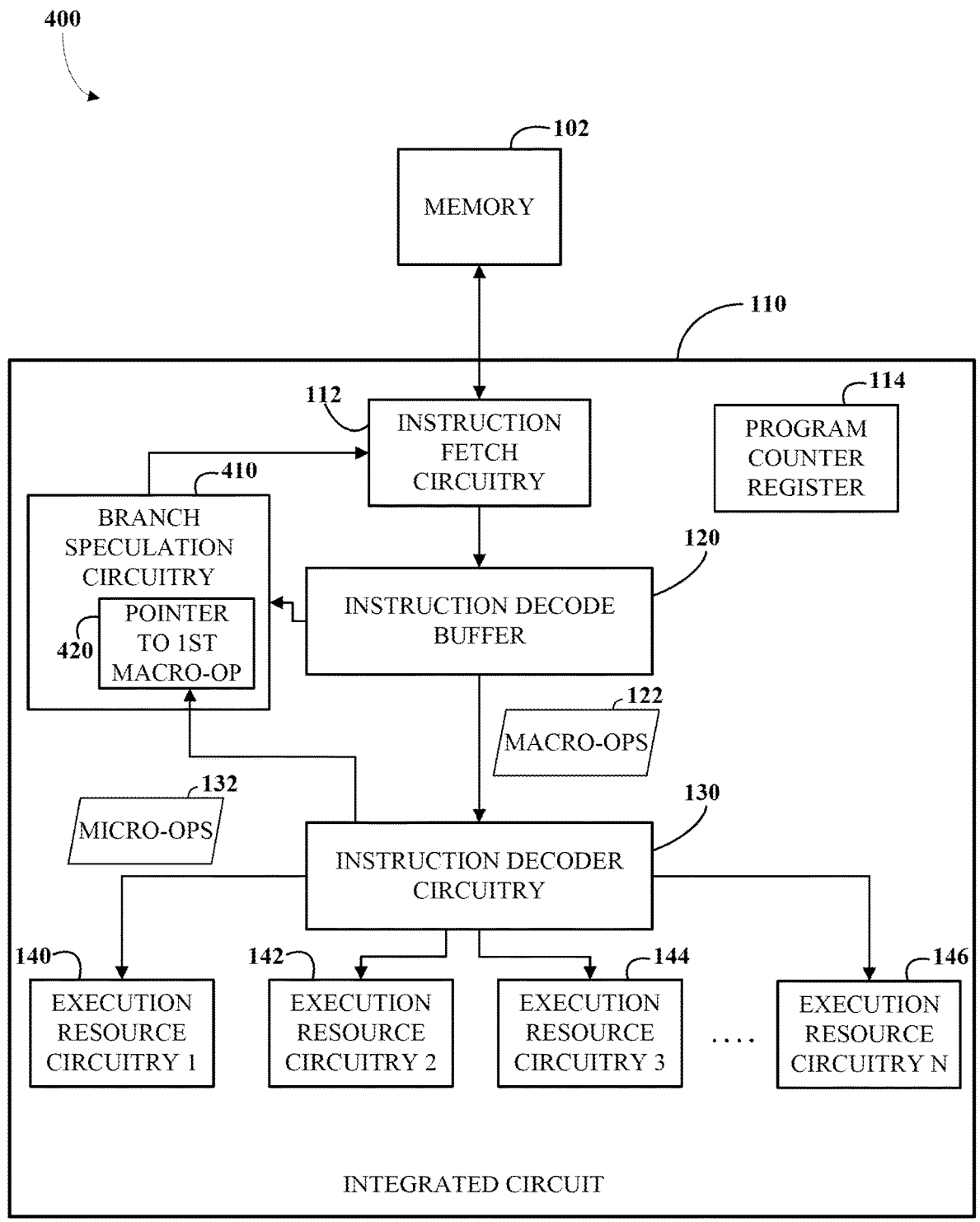
FIG. 4 is a block diagram of an example of a system for executing instructions from an instruction set with macro-op fusion that supports pipeline flush for mispredictions of a branch occurring between fused macro-ops.

FIG. 4 is a block diagram of an example of a system 400 for executing instructions from an instruction set with macro-op fusion that supports pipeline flush for mispredictions of a branch occurring between fused macro-ops. The system 400 is similar to the system 100 of FIG. 1, with the addition of a branch speculation circuitry 410 configured to implement branch prediction with support for pipeline flushes where a misprediction invalidates a fused micro-op. For example, the system 400 may be used to implement the process 600 of FIG. 6. For example, the system 400 may be used to implement the process 800 of FIG. 8.

The system 200 includes a branch speculation circuitry 410 configured to generate branch predictions for some control flow instructions in the instruction decode buffer 120 in order to direct fetch of macro-ops from the memory 102 by the instruction fetch circuitry 112. These branch predictions can be wrong, and when execution reveals a branch prediction to be wrong (i.e., a misprediction has occurred), the branch speculation circuitry 410 may be configured to flush a processor pipeline, to restart execution after the last properly committed instruction. However, where a mispredicted branch instruction occurs in a program order between two instructions that are fused into a single micro-op, the micro-op may be invalidated. To accommodate this circumstance, the branch speculation circuitry 410 may be configured to flush the processor pipeline in a manner that restarts execution at a first macro-op of an improperly fused set of macro-ops, instead of only going back to the mispredicted conditional branch macro-op. To facilitate the flush restarting at the first macro-op, the branch speculation circuitry 410 may store a pointer 420 to the first macro-op, associated with a prediction of whether the conditional branch macro-op will be taken. For example, the pointer 420 may be a program counter value of the first macro-op. For example, the pointer 420 may be stored in register or another micro-architectural buffer that is associated with an entry in a prediction table stored by the branch speculation circuitry 410. The branch speculation circuitry 410 may be configured to, responsive to detecting that the conditional branch macro-op has been mispredicted, flush a processor pipeline (e.g., the processor pipeline 500) including the instruction decoder circuitry 120 and the one or more execution resource circuitries (140, 142, 144, and 146) to restart execution with the first macro-op.

Figure 5:
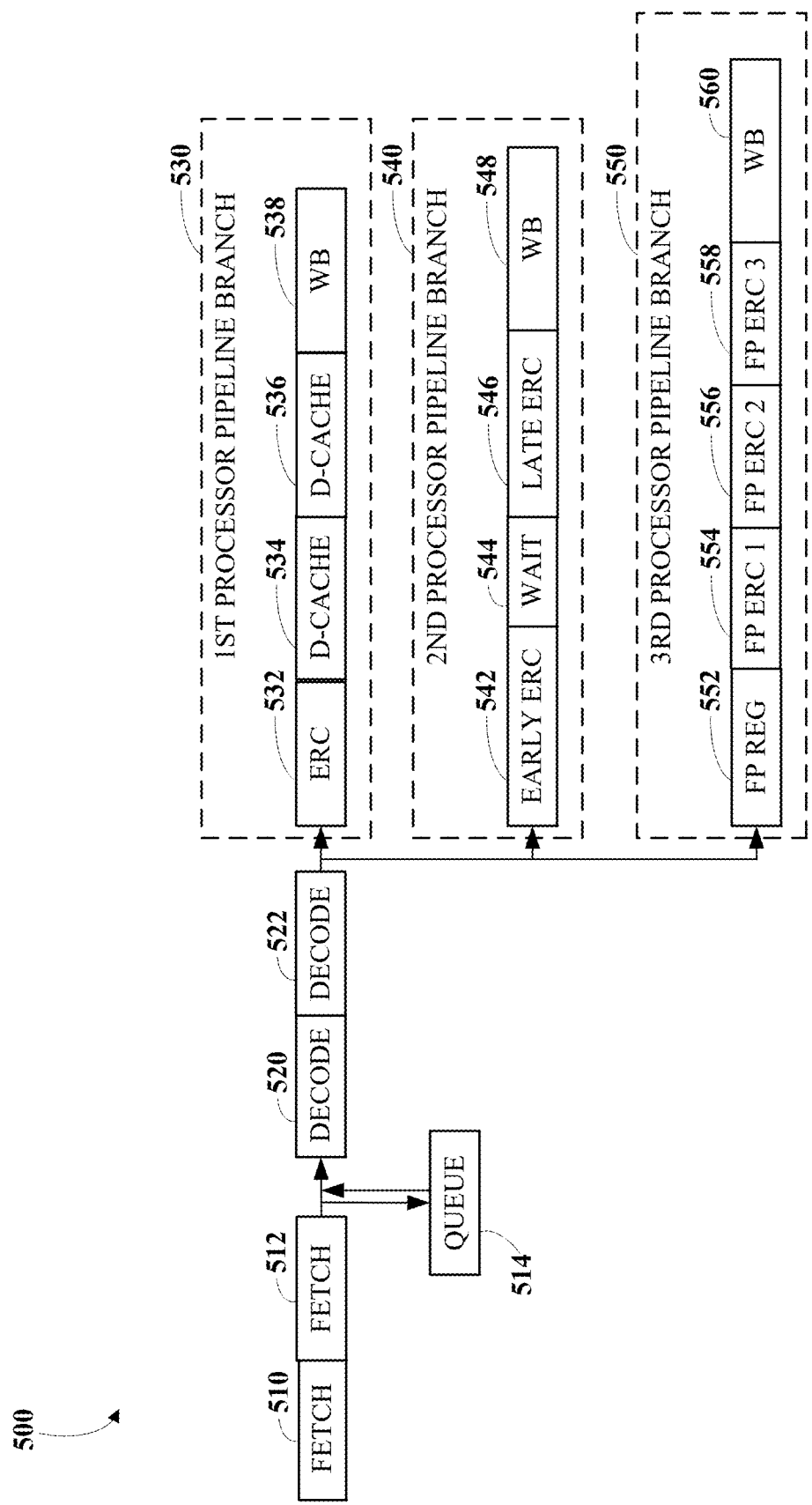
FIG. 5 is a block diagram of an example of a processor pipeline for executing instructions from an instruction set with macro-op fusion.

FIG. 5 is a block diagram of an example of a processor pipeline 500 for executing instructions from an instruction set with macro-op fusion. The processor pipeline 500 includes a first fetch stage 510 and a second fetch stage 512 that load macro-ops from memory into a queue 514 (e.g., a queue stored in the instruction decode buffer 120). The processor pipeline 500 includes a first decode stage 520 and a second decode stage 522 that decodes instructions in the queue 514 and dispatches them as micro-ops to one or more execution resource circuitries of three processor pipeline branches (530, 540, and 550). The first processor pipeline branch 530 includes an execution resource circuitry 532 (e.g., an ALU), a first data cache stage 534, a second data cache stage 536, and a write back stage 538. The second processor pipeline branch 540 includes an early execution resource circuitry 542 (e.g., an early ALU), a wait stage 544, a late execution resource circuitry 546 (e.g., a late ALU), and a write back stage 548. The third processor pipeline branch 550 includes a floating point register read stage 552, a first floating point execution resource circuitry 554 (e.g., a first floating point ALU stage), a second floating point execution resource circuitry 556 (e.g., a second floating point ALU stage), a third floating point execution resource circuitry 558 (e.g., a third floating point ALU stage), and a write back stage 560.

The processor pipeline 500 may be implemented by the integrated circuit 110 of FIGS. 1, 2, and/or 4. In this example, one or more execution resource circuitries include an early execution resource circuitry 542 and a late execution resource circuitry 546 that is after the early execution resource circuitry 542 in the processor pipeline 500 and is configured to take output from the early execution resource circuitry 542 as input. For example, a micro-op, resulting from fusion of a first macro-op and a last macro-op, may be executed by both the early execution resource circuitry 542 and the late execution resource circuitry 546. In this example, one or more execution resource circuitries include a first execution resource circuitry 532 in a first processor pipeline branch 530 and a second execution resource circuitry 542 in a second processor pipeline branch 540 that operates in parallel with the first processor pipeline branch 530, For example, a micro-op, resulting from fusion of a first macro-op and a last macro-op, may be executed by both the first execution resource circuitry 532 and the second execution resource circuitry 542.

Figure 6:
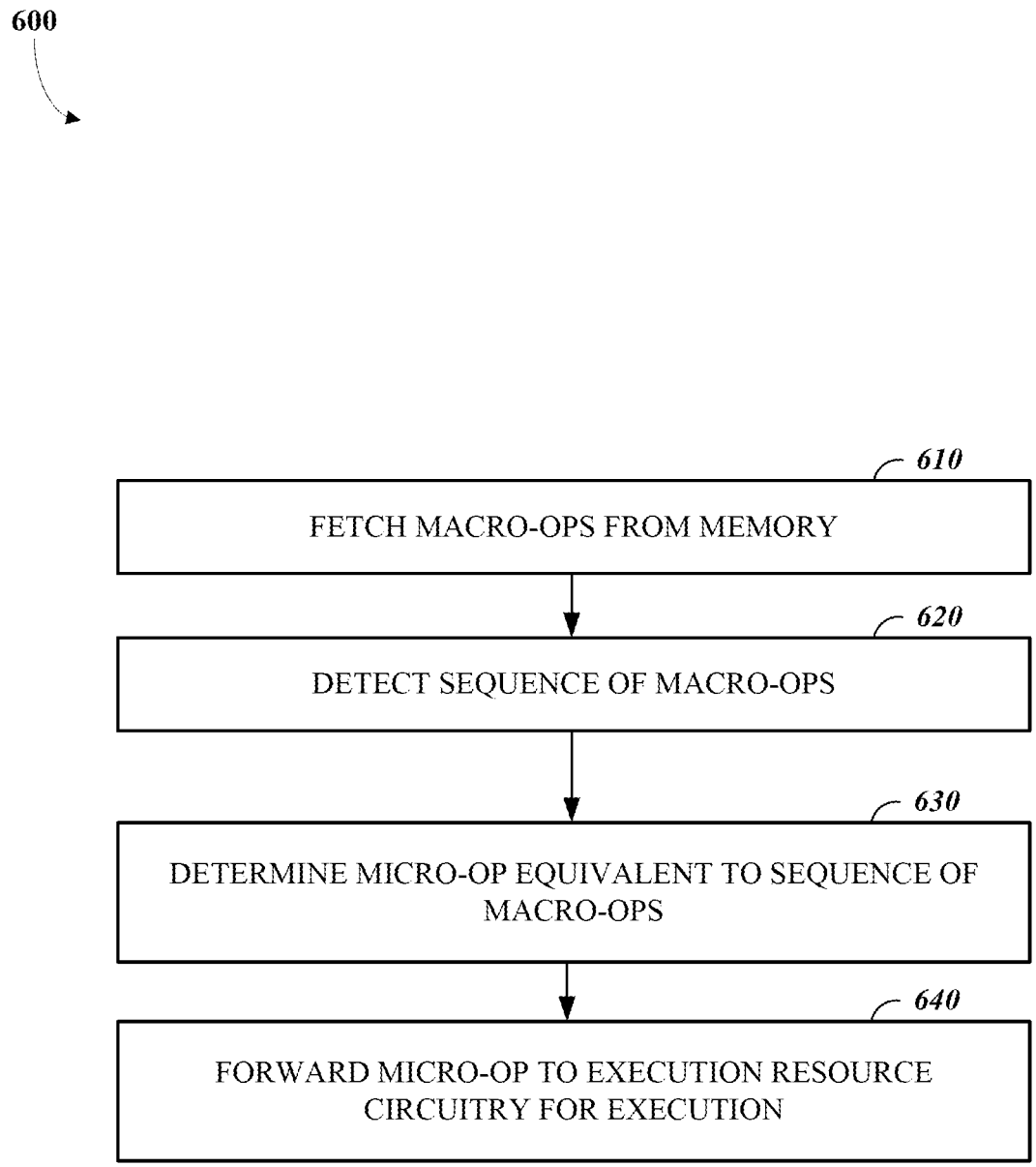
FIG. 6 is a flow chart of an example of a process for executing instructions from an instruction set with macro-op fusion.

FIG. 6 is a flow chart of an example of a process 600 for executing instructions from an instruction set with macro-op fusion. The process 600 includes fetching 610 macro-ops from memory; detecting 620 a sequence of macro-ops stored in the instruction decode buffer, the sequence of macro-ops including a first macro-op, followed by one or more intervening macro-ops, followed by a last macro-op; determining 630 a micro-op that is equivalent to the first macro-op combined with the last macro-op; and forwarding 640 the micro-op to at least one execution resource circuitry for execution. For example, the process 600 may be implemented using the system 100 of FIG. 1. For example, the process 600 may be implemented using the system 200 of FIG. 2. For example, the process 600 may be implemented using the system 400 of FIG. 4.

The process 600 includes fetching 610 macro-ops from memory and storing the macro-ops in an instruction decode buffer (e.g., the instruction decode buffer 120). The instruction decode buffer may be configured to store macro-ops fetched from memory while the macro-ops are processed by a pipelined architecture of an integrated circuit (e.g., a processor or microcontroller). For example, the instruction decode buffer may have a depth (e.g., 4, 8, 12, 16, or 24 instructions) that facilitates a pipelined and/or superscalar architecture of the integrated circuit. The macro-ops may be members of an instruction set (e.g., a RISC V instruction set, an x86 instruction set, an ARM instruction set, or a MIPS instruction set) supported by the integrated circuit.

The process 600 includes detecting 620 a sequence of macro-ops stored in the instruction decode buffer, the sequence of macro-ops including a first macro-op, followed by one or more intervening macro-ops, followed by a last macro-op. For example, detecting 620 the sequence of macro-ops may include detecting a sequence of opcodes as portions of the respective macro-ops. For example, the one or more intervening macro-ops may include at least two macro-ops. In some implementations, the one or more intervening macro-ops consist of a number of macro-ops equal to two less than the number of macro-ops that the instruction decode buffer is sized to store. In some implementations, detecting 620 the sequence of macro-ops in time to facilitate macro-op fusion is enabled by using a fusion predictor (e.g., the fusion predictor circuitry 310 of FIG. 3) to first detect a prefix of the sequence and delay execution of the prefix until the remainder of the sequence on macro-ops is fetched 610 from memory. For example, the process 900 of FIG. 9 may be implemented to facilitate detection and fusing of the sequence of macro-ops.

The process 600 includes determining 630 a micro-op that is equivalent to the first macro-op combined with the last macro-op. Determining 630 the micro-op may include checking conditions for fusion before determining the micro-op based on the first macro-op and the last macro-op. In some implementations, determining 630 the micro-op includes checking that the last macro-op is independent of the one or more intervening macro-ops. In some implementations (e.g., in an in-order processor), determining 630 the micro-op includes checking that the one or more intervening macro-ops can be issued in a same clock cycle as the micro-op resulting from fusion of the first macro-op and the last macro-op. In some implementations, determining 630 the micro-op includes determining a prediction of whether a delay caused by fusing the first macro-op with the last macro-op will be below a threshold. The micro-op may be determined 630 responsive to the prediction indicating that the delay will be below the threshold. This prediction about the delay caused by fusion may be used to better balance the delay caused by fusion against the benefits of fusion, such as reducing a number of reorder buffer entries used. For example, determining 630 the micro-op may include implementing the process 700 of FIG. 7 to determine whether to fuse the first macro-op with the last macro-op. In some implementations, the last macro-op is a control flow instruction (e.g., a branch instruction or a call instruction), which may simplify checks for fusion, where the control flow macro-op may only change the value stored in a program counter register of a processor core, while leaving the rest of the state of the processor unchanged.

The one or more intervening macro-ops may include a conditional branch macro-op. A conditional branch instruction may be predicted to enable speculative execution increase data throughput of a processor, however those predictions can be wrong and recovering from a wrong prediction for the branch may involve flushing a processor pipeline to restart execution with the correct sequence of instructions. A wrong prediction is called a misprediction. A misprediction of a branch occurring between the first macro-op and the last macro-op that are fused may invalidate the resulting micro-op, since the last macro-op should not be executed. To address an invalid micro-op resulting from fusion based on a misprediction, a pipeline flush to recover from the misprediction may go further back to restart execution with the first macro-op being executed again as micro-op based only on the first macro-op. In some implementations, the process 600 includes storing a pointer to the first macro-op, associated with a prediction of whether the conditional branch macro-op will be taken; and, responsive to detecting that the conditional branch macro-op has been mispredicted, flushing a processor pipeline including the one or more execution resource circuitries to restart execution with the first macro-op. The pointer may be used to associate the first macro-op with the misprediction and facilitate the flushing of the processor pipeline. For example, the process 600 may include implementing the process 800 of FIG. 8.

The process 600 includes forwarding 640 forwarding the micro-op to one or more execution resource circuitries for execution. The one or more execution resource circuitries (e.g., 140, 142, 144, and/or 146 of FIG. 1) may be configured to execute micro-ops to support an instruction set including macro-ops. For example, the instruction set may be a RISC V instruction set. For example, the one or more execution resource circuitries may include an adder, a shift register, a multiplier, and/or a floating point unit. The one or more execution resource circuitries may update the state of an integrated circuit (e.g., a processor or microcontroller) that is implementing the process 600, including internal registers and/or flags or status bits based on results of executing a micro-op. Results of execution of a micro-op may also be written to the memory (e.g., during subsequent stages of a pipelined execution).

The sequence of macro-ops may include a first macro-op followed by a last macro-op (i.e., with or without intervening macro-ops between the first macro-op and the last macro-op). In some implementations, the one or more execution resource circuitries include an early execution resource circuitry and a late execution resource circuitry that is after the early execution resource circuitry in a processor pipeline (e.g., in the processor pipeline 500 of FIG. 5) and is configured to take output from the early execution resource circuitry as input, and in which the micro-op is executed by both the early execution resource circuitry and the late execution resource circuitry. In some implementations, the one or more execution resource circuitries include a first execution resource circuitry in a first processor pipeline branch and a second execution resource circuitry in a second processor pipeline branch that operates in parallel with the first processor pipeline branch, and in which the micro-op is executed by both the first execution resource circuitry and the second execution resource circuitry.

Figure 7:
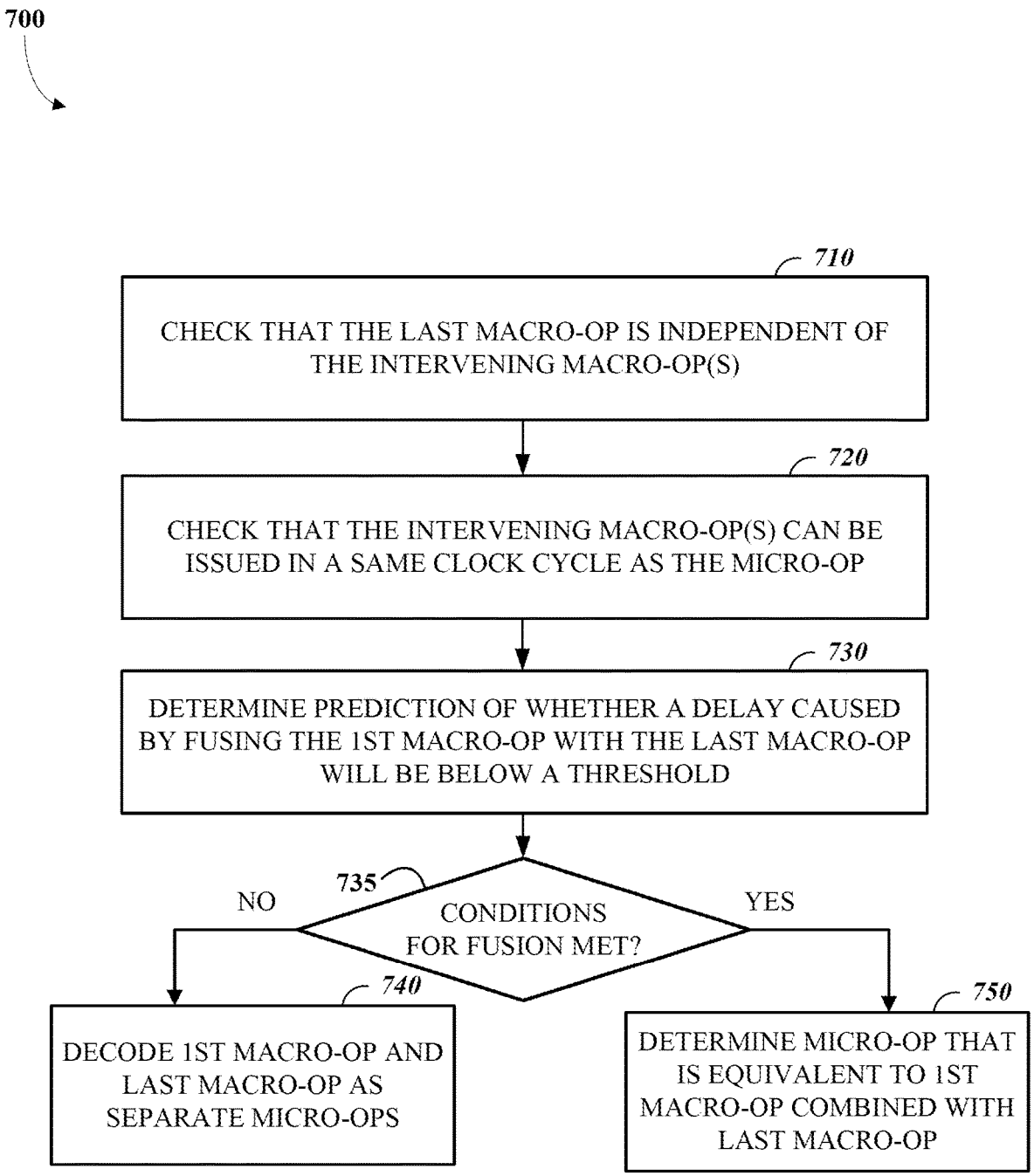
FIG. 7 is a flow chart of an example of a process for determining whether to fuse macro-ops occurring in a sequence of macro-ops.

FIG. 7 is a flow chart of an example of a process 700 for determining whether to fuse macro-ops occurring in a sequence of macro-ops. The process 700 includes checking 710 that the last macro-op is independent of the one or more intervening macro-ops; checking 720 that the one or more intervening macro-ops can be issued in a same clock cycle as the micro-op; and determining 730 a prediction of whether a delay caused by fusing the first macro-op with the last macro-op will be below a threshold. If, at step 735, the conditions for fusion are not met, then the process 700 includes, decoding 740 the first macro-op and the last macro-op as separate micro-ops. If, at step 735, the conditions for fusion are met, then the process 700 includes, responsive to the prediction indicating that the delay will be below the threshold, determining 750 the micro-op that is equivalent to the first macro-op combined with the last macro-op.

Figure 8:
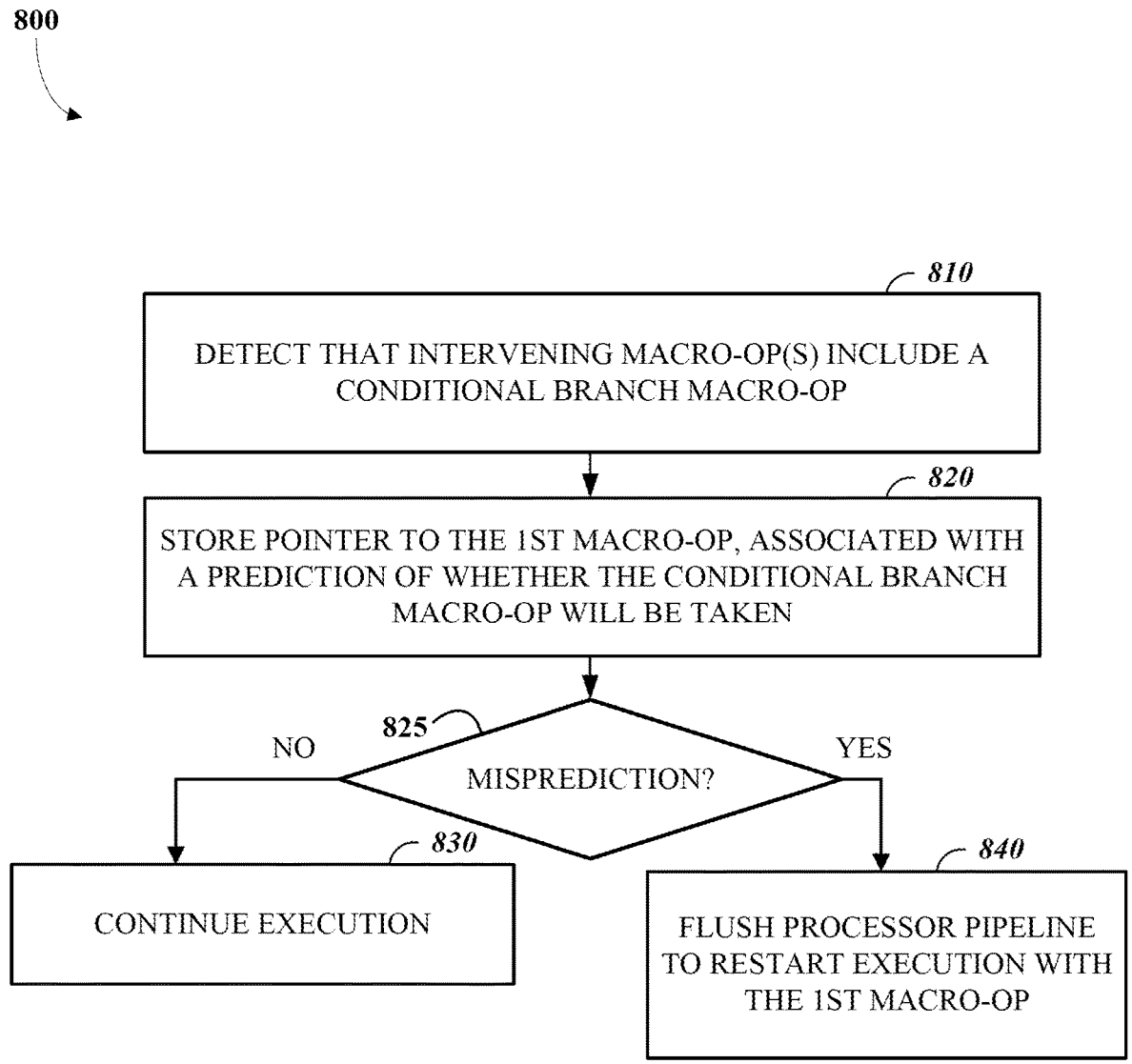
FIG. 8 is a flow chart of an example of a process for supporting pipeline flush for mispredictions of a branch occurring between fused macro-ops.

FIG. 8 is a flow chart of an example of a process 800 for supporting pipeline flush for mispredictions of a branch occurring between fused macro-ops. The process 800 includes detecting 810 that the intervening macro-ops includes a conditional branch macro-op; storing 820 a pointer (e.g., the pointer 420) to the first macro-op, associated with a prediction of whether the conditional branch macro-op will be taken. If, at step 825, a misprediction of the conditional branch macro-op is not detected, the process 800 includes continuing 830 execution as normal and committing the micro-op that is equivalent to the first macro-op combined with the last macro-op. If, at step 825, a misprediction of the conditional branch macro-op is detected, the process 800 includes, responsive to detecting that the conditional branch macro-op has been mispredicted, flushing 840 a processor pipeline including the one or more execution resource circuitries to restart execution with the first macro-op.

Figure 9:
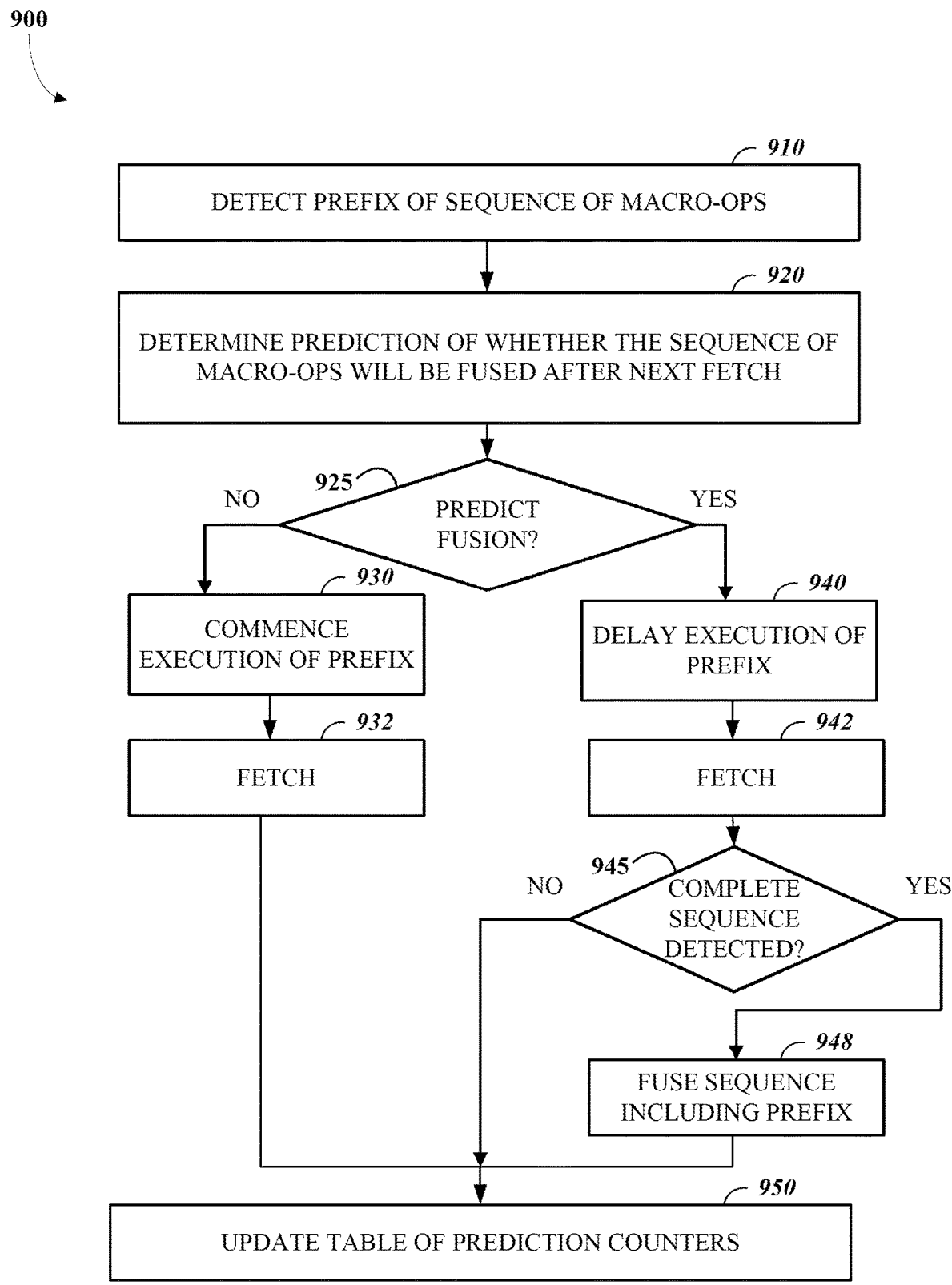
FIG. 9 is a flow chart of an example of a process for predicting beneficial macro-op fusion.

FIG. 9 is a flow chart of an example of a process 900 for predicting beneficial macro-op fusion. The process 900 includes detecting 910 a prefix of the sequence of macro-ops; determining 920 a prediction of whether the sequence of macro-ops will be completed in a next fetch of macro-ops from memory and fused; when no fusion is predicted, commence 930 execution of the prefix prior to fetching 932 a next batch of one or more macro-ops; when fusion is predicted, delaying 940 execution of the prefix until after fetching 942 a next batch of one or more macro-ops; if the complete sequence of macro-ops is detected 945, fusing 948 the sequence of macro-ops including the prefix; and updating 950 a table of prediction counters. For example, the process 900 may be implemented using the fusion predictor circuitry 210 of FIG. 2. For example, the process 900 may be implemented using the fusion predictor circuitry 310 of FIG. 3. The process 900 may be utilized to facilitate fusion of many different types of sequences of macro-ops, including sequences that may lack a control-flow instruction.

The process 900 includes detecting 910 a prefix of the sequence of macro-ops in an instruction decode buffer (e.g., the instruction decode buffer 120). For example, where an instruction decoder is configured to detect a sequence of macro-op instructions that includes instructions 1 through N (e.g., N=2, 3, 4, or 5) when it occurs in the instruction decode buffer, prefixes including the one or more macro-op instructions 1 through m, where 1<=m<N, may be detected 910 when they occur in the instruction decode buffer. For example, detecting 910 the prefix may include detecting a sequence of opcodes as portions of the respective macro-ops of the prefix.

The process 900 includes determining 920 a prediction of whether the sequence of macro-ops will be completed in a next fetch of macro-ops from memory and fused. For example, the prediction may be determined 920 using a table of prediction counters that is maintained by a fusion predictor circuit. The prediction counters may serve as estimates of a likelihood that a prefix will be part of a sequence of macro-ops that is completed and fused. For example, the prediction counters may be K bit counters with K>1 (e.g., K=2) to provide some hysteresis. For example, a prediction may be determined 920 as yes or true if a corresponding prediction counter has a current value >=2^K (e.g., the last bit of the counter is a one), and determined 920 as no or false otherwise. In some implementations, the table of prediction counters is indexed by a program counter. In some implementations, the table of prediction counters is indexed by a hash of a program counter and program counter history. In some implementations, the table of prediction counters is tagged with program counter values. For example, a program counter used to index the table of prediction counters can be that used to fetch the last group of instructions, or the program counter of the potential fusion prefix, or the program counter of the next group to be fetched. In some implementations, the table of prediction counters is tagless where the entries are used without considering a program counter.

The process 900 includes, if (at operation 925) no fusion is predicted to occur, then execution of the prefix is commenced 930 prior to fetching 932 a next batch of one or more macro-ops. For example, the commencing 930 execution of the prefix may include forwarding a micro-op version of a macro-op of the prefix to one or more execution resources for execution.

The process 900 includes, if (at operation 925) a fusion is predicted to occur, based on the prediction, delaying 940 execution of the prefix until after a next fetch to enable fusion of the sequence of macro-ops. For example, the delaying 940 execution may include holding the one or more macro-ops of the prefix in a decode stage of a pipeline for multiple clock cycles.

After fetching 942 a next batch of one or more macro-ops, if (at operation 945) the complete sequence of macro-ops is detected, then the complete sequence of macro-ops, including the prefix, is fused 948 to form a single micro-op for execution. For example, the sequence of macro-ops may be fused 948 using the process 600 of FIG. 6. If (at operation 945) the complete sequence of macro-ops is not detected, then execution proceeds as normal, starting with the delayed 940 instructions of the prefix.

The process 900 includes maintaining a table of prediction counters that is used for determining 920 predictions. For example, the process 900 include updating 950 the table of prediction counters after detecting 910 a prefix a fetching (932 or 942) a next batch of one or more macro-ops. For example, the table of prediction counters may be updated 950 based on whether the sequence of macro-ops is completed by the next fetch of macro-ops from memory. For example, the table of prediction counters may be updated 950 based on whether there are instructions in the next fetch that depend on instructions in the prefix. For example, the table of prediction counters may be updated 950 based on whether fusion would prevent parallel issue of instructions that follow the fusible sequence in the next fetch group.

Figure 10:
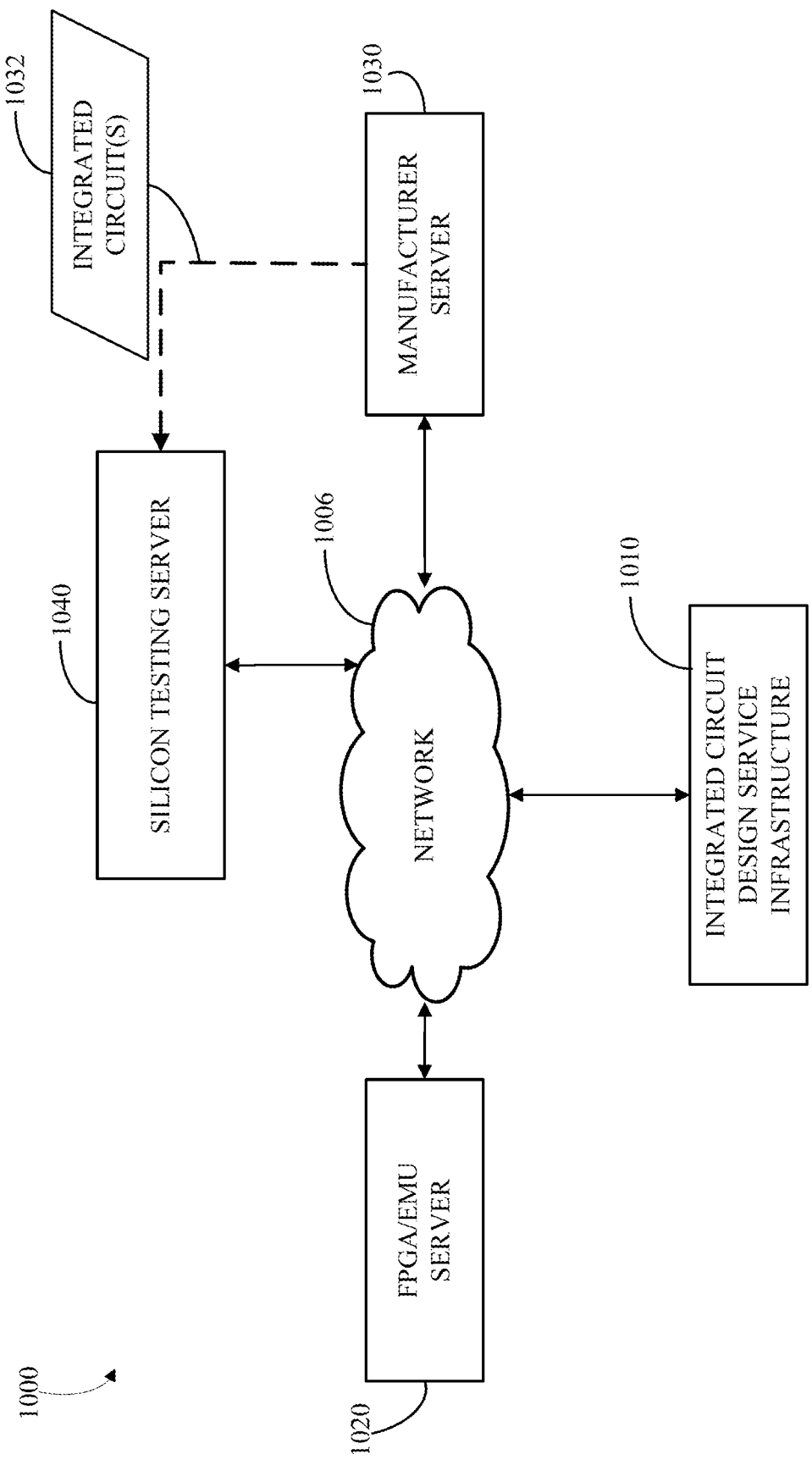
FIG. 10 is a block diagram of an example of a system for facilitating generation and manufacture of integrated circuits.

FIG. 10 is a block diagram of an example of a system 1000 for generation and manufacture of integrated circuits. The system 1000 includes a network 1006, an integrated circuit design service infrastructure 1010, a field programmable gate array (FPGA)/emulator server 1020, and a manufacturer server 1030. For example, a user may utilize a web client or a scripting API client to command the integrated circuit design service infrastructure 1010 to automatically generate an integrated circuit design based a set of design parameter values selected by the user for one or more template integrated circuit designs. In some implementations, the integrated circuit design service infrastructure 1010 may be configured to generate an integrated circuit design that includes the circuitry shown and described in FIGS. 1-4.

The integrated circuit design service infrastructure 1010 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high-level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 1010 may invoke (e.g., via network communications over the network 1006) testing of the resulting design that is performed by the FPGA/emulation server 1020 that is running one or more FPGAs or other types of hardware or software emulators. For example, the integrated circuit design service infrastructure 1010 may invoke a test using a field programmable gate array, programmed based on a field programmable gate array emulation data structure, to obtain an emulation result. The field programmable gate array may be operating on the FPGA/emulation server 1020, which may be a cloud server. Test results may be returned by the FPGA/emulation server 1020 to the integrated circuit design service infrastructure 1010 and relayed in a useful format to the user (e.g., via a web client or a scripting API client).

The integrated circuit design service infrastructure 1010 may also facilitate the manufacture of integrated circuits using the integrated circuit design in a manufacturing facility associated with the manufacturer server 1030. In some implementations, a physical design specification (e.g., a graphic data system (GDS) file, such as a GDS II file) based on a physical design data structure for the integrated circuit is transmitted to the manufacturer server 1030 to invoke manufacturing of the integrated circuit (e.g., using manufacturing equipment of the associated manufacturer). For example, the manufacturer server 1030 may host a foundry tape out website that is configured to receive physical design specifications (e.g., as a GDSII file or an OASIS file) to schedule or otherwise facilitate fabrication of integrated circuits. In some implementations, the integrated circuit design service infrastructure 1010 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 1010 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 1030 may fabricate and/or test integrated circuits based on the integrated circuit design. For example, the associated manufacturer (e.g., a foundry) may perform optical proximity correction (OPC) and similar post-tapeout/pre-production processing, fabricate the integrated circuit(s) 1032, update the integrated circuit design service infrastructure 1010 (e.g., via communications with a controller or a web application server) periodically or asynchronously on the status of the manufacturing process, perform appropriate testing (e.g., wafer testing), and send to packaging house for packaging. A packaging house may receive the finished wafers or dice from the manufacturer and test materials and update the integrated circuit design service infrastructure 1010 on the status of the packaging and delivery process periodically or asynchronously. In some implementations, status updates may be relayed to the user when the user checks in using the web interface and/or the controller might email the user that updates are available.

In some implementations, the resulting integrated circuits 1032 (e.g., physical chips) are delivered (e.g., via mail) to a silicon testing service provider associated with a silicon testing server 1040. In some implementations, the resulting integrated circuits 1032 (e.g., physical chips) are installed in a system controlled by silicon testing server 1040 (e.g., a cloud server) making them quickly accessible to be run and tested remotely using network communications to control the operation of the integrated circuits 1032. For example, a login to the silicon testing server 1040 controlling a manufactured integrated circuits 1032 may be sent to the integrated circuit design service infrastructure 1010 and relayed to a user (e.g., via a web client). For example, the integrated circuit design service infrastructure 1010 may control testing of one or more integrated circuits 1032, which may be structured based on an RTL data structure.

Figure 11:
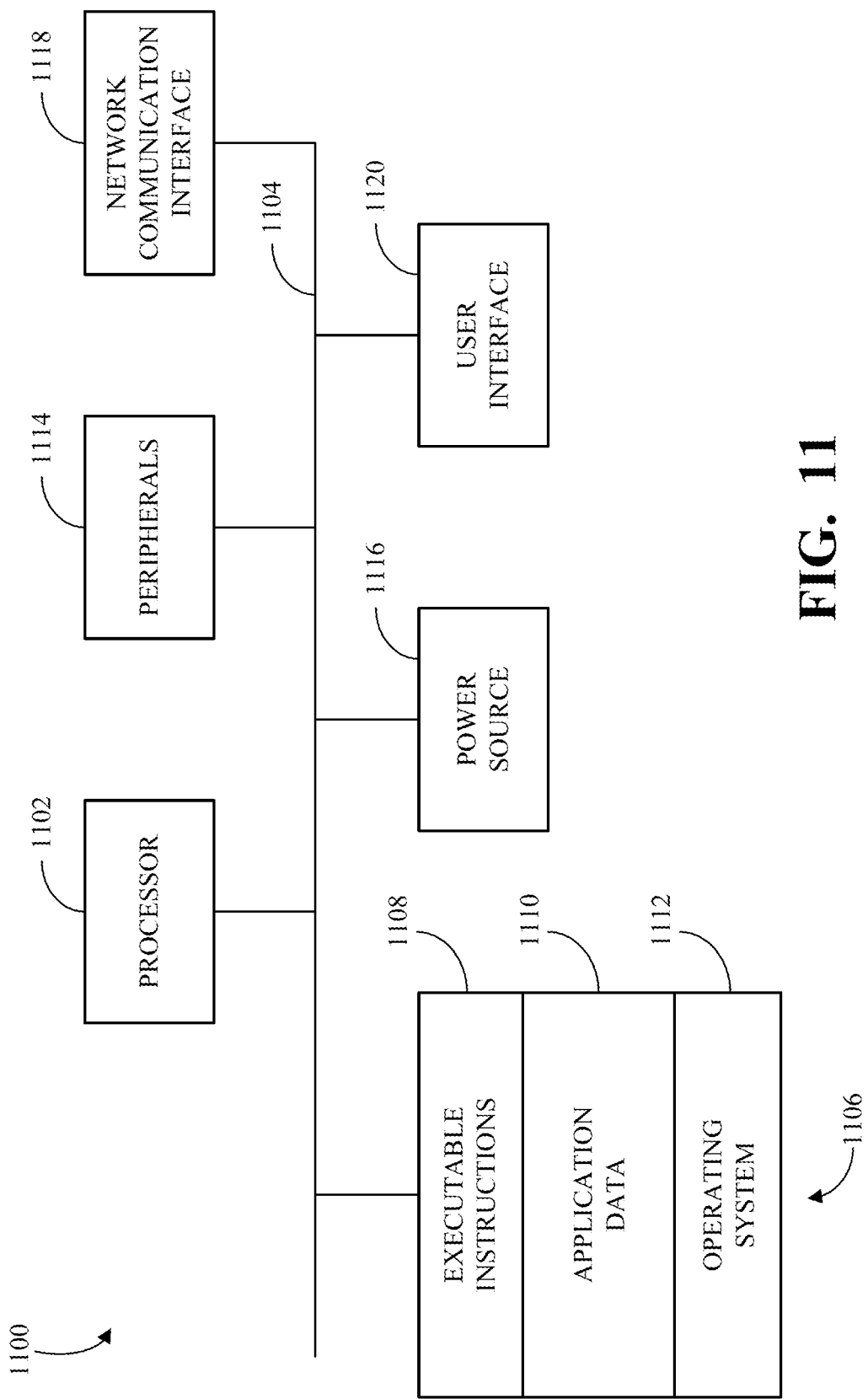
FIG. 11 is a block diagram of an example of a system for facilitating generation of integrated circuits.

FIG. 11 is a block diagram of an example of a system 1100 for facilitating generation of integrated circuits, for facilitating generation of a circuit representation for an integrated circuit, and/or for programming or manufacturing an integrated circuit. The system 1100 is an example of an internal configuration of a computing device. The system 1100 may be used to implement the integrated circuit design service infrastructure 1010, and/or to generate a file that generates a circuit representation of an integrated circuit design including the circuitry shown and described in FIGS. 1-4. The system 1100 can include components or units, such as a processor 1102, a bus 1104, a memory 1106, peripherals 1114, a power source 1116, a network communication interface 1118, a user interface 1120, other suitable components, or a combination thereof.

The processor 1102 can be a central processing unit (CPU), such as a microprocessor, and can include single or multiple processors having single or multiple processing cores. Alternatively, the processor 1102 can include another type of device, or multiple devices, now existing or hereafter developed, capable of manipulating or processing information. For example, the processor 1102 can include multiple processors interconnected in any manner, including hard-wired or networked, including wirelessly networked. In some implementations, the operations of the processor 1102 can be distributed across multiple physical devices or units that can be coupled directly or across a local area or other suitable type of network. In some implementations, the processor 1102 can include a cache, or cache memory, for local storage of operating data or instructions.

The memory 1106 can include volatile memory, non-volatile memory, or a combination thereof. For example, the memory 1106 can include volatile memory, such as one or more DRAM modules such as double data rate (DDR) synchronous dynamic random access memory (SDRAM), and non-volatile memory, such as a disk drive, a solid state drive, flash memory, Phase-Change Memory (PCM), or any form of non-volatile memory capable of persistent electronic information storage, such as in the absence of an active power supply. The memory 1106 can include another type of device, or multiple devices, now existing or hereafter developed, capable of storing data or instructions for processing by the processor 1102. The processor 1102 can access or manipulate data in the memory 1106 via the bus 1104. Although shown as a single block in FIG. 11, the memory 1106 can be implemented as multiple units. For example, a system 1100 can include volatile memory, such as RAM, and persistent memory, such as a hard drive or other storage.

The memory 1106 can include executable instructions 1108, data, such as application data 1110, an operating system 1112, or a combination thereof, for immediate access by the processor 1102. The executable instructions 1108 can include, for example, one or more application programs, which can be loaded or copied, in whole or in part, from non-volatile memory to volatile memory to be executed by the processor 1102. The executable instructions 1108 can be organized into programmable modules or algorithms, functional programs, codes, code segments, or combinations thereof to perform various functions described herein. For example, the executable instructions 1108 can include instructions executable by the processor 1102 to cause the system 1100 to automatically, in response to a command, generate an integrated circuit design and associated test results based on a design parameters data structure. The application data 1110 can include, for example, user files, database catalogs or dictionaries, configuration information or functional programs, such as a web browser, a web server, a database server, or a combination thereof. The operating system 1112 can be, for example, Microsoft Windows®, macOS®, or Linux®; an operating system for a small device, such as a smartphone or tablet device; or an operating system for a large device, such as a mainframe computer. The memory 1106 can comprise one or more devices and can utilize one or more types of storage, such as solid state or magnetic storage.

The peripherals 1114 can be coupled to the processor 1102 via the bus 1104. The peripherals 1114 can be sensors or detectors, or devices containing any number of sensors or detectors, which can monitor the system 1100 itself or the environment around the system 1100. For example, a system 1100 can contain a temperature sensor for measuring temperatures of components of the system 1100, such as the processor 1102. Other sensors or detectors can be used with the system 1100, as can be contemplated. In some implementations, the power source 1116 can be a battery, and the system 1100 can operate independently of an external power distribution system. Any of the components of the system 1100, such as the peripherals 1114 or the power source 1116, can communicate with the processor 1102 via the bus 1104.

The network communication interface 1118 can also be coupled to the processor 1102 via the bus 1104. In some implementations, the network communication interface 1118 can comprise one or more transceivers. The network communication interface 1118 can, for example, provide a connection or link to a network, such as the network 1006 shown in FIG. 10, via a network interface, which can be a wired network interface, such as Ethernet, or a wireless network interface. For example, the system 1100 can communicate with other devices via the network communication interface 1118 and the network interface using one or more network protocols, such as Ethernet, transmission control protocol (TCP), Internet protocol (IP), power line communication (PLC), wireless fidelity (Wi-Fi), infrared, general packet radio service (GPRS), global system for mobile communications (GSM), code division multiple access (CDMA), or other suitable protocols.

A user interface 1120 can include a display; a positional input device, such as a mouse, touchpad, touchscreen, or the like; a keyboard; or other suitable human or machine interface devices. The user interface 1120 can be coupled to the processor 1102 via the bus 1104. Other interface devices that permit a user to program or otherwise use the system 1100 can be provided in addition to or as an alternative to a display. In some implementations, the user interface 1120 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 1114. The operations of the processor 1102 can be distributed across multiple clients or servers, which can be coupled directly or across a local area or other suitable type of network. The memory 1106 can be distributed across multiple clients or servers, such as network-based memory or memory in multiple clients or servers performing the operations of clients or servers. Although depicted here as a single bus, the bus 1104 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

When two instructions are fused, if something goes wrong with the fused operation (for example, an exception is thrown), then the processor needs to handle this condition as if the fused operation is two separate instructions. For example, the instruction pair may be marked as "not able to be fused" and the instruction pair is replayed as individual instructions. There is a difference between an instruction that can throw an exception and an instruction that cannot throw an exception. An exception is an unscheduled event that disrupts program execution or control flow, typically due to an event in the processor.

There are at least two different techniques that may be used to increase the amount of macro-op fusion in a processor. First is "skip over" fusion where in a sequence of Instruction 1, Instruction 2, and Instruction 3, Instruction 1 and Instruction 3 are fused and are performed together, and then Instruction 2 is performed later. Second is a situation involving a "dynamic dead write" prediction, in which if the data of a store instruction is predicted to not be later used by the program, the store instruction is skipped (effectively fusing the store instruction with another instruction).

Fusion in an In-Order Processor

For example, in an in-order processor, suppose there are three instructions: Instruction 1, Instruction 2, and Instruction 3. If Instruction 3 writes a state of the processor, the processor cannot issue Instruction 1 if it cannot also issue Instruction 2. The processor can fuse Instruction 1 and Instruction 3 if it can issue all three instructions at the same time. If the processor cannot issue all three instructions at the same time, then it would break the in-order property of the processor by issuing Instruction 3 before Instruction 2. But if Instruction 3 is a branch instruction that does not write a state of the processor (i.e., does not update any state of the processor, and only changes the program counter), then the processor can fuse Instruction 1 and Instruction 3 and issue Instruction 2 later. If Instruction 3 is a branch instruction that is found to be correctly predicted, it is acceptable that Instruction 2 does not get issued and the processor can fuse Instruction 1 and Instruction 3 and can effectively execute the branch instruction out of order.

The reason the instructions can be fused is that if Instruction 3 changes the state of the processor and causes an exception (and Instruction 2 has not yet issued), it looks like Instruction 3 happened but Instruction 2 did not happen, which would be an illegal operation because the in-order processor has a single issue point and all instructions must issue in program order (i.e., Instruction 1, then Instruction 2, then Instruction 3). If Instruction 3 is a branch instruction, its only effect is to change the program flow, so if Instruction 2 causes an exception, the program would flow back to Instruction 2, which is acceptable. If Instruction 3 is a jump instruction (or any other control flow change instruction where the only effect is to change the control flow), it would be acceptable to issue Instruction 3 before issuing Instruction 2. It is noted that a "jump and link" instruction (e.g., an instruction that writes a return address to a register) would not be an acceptable instruction to be issued out of order because it writes a state of the processor. Fusing other instructions with branch instructions is common.

The fused Instruction 1-Instruction 3 and Instruction 2 can be issued at the same time using different pipelines, and it is acceptable for these to proceed along the different pipelines in parallel.

If Instruction 2 is a branch instruction that does not change the state of the processor and only changes control flow, it is acceptable to issue Instruction 2 before the fused Instruction 1-Instruction 3.

In a situation where the branch target of Instruction 2 is predicted to point to Instruction 3, there are two possible scenarios. A first scenario is that the predicted branch Instruction 2 was correct, then there would not be any problems with issuing Instruction 2 before the fused Instruction 1-Instruction 3. A second scenario is that the predicted branch Instruction 2 was a misprediction, then Instruction 1 would have to be replayed, and Instruction 1 and Instruction 3 should not be fused.

In some implementations, a predictor determines when fusion would be beneficial. In one implementation, it is possible to fuse non-sequential instructions; for example, by fusing two instructions that are separated by a third independent instruction. For the fusion to be successful, the third independent instruction cannot affect the two instructions being fused. In some implementations, there may be more than one instruction between the two instructions being fused.

Fusion in an Out-of-Order Processor

In an out-of-order processor, the processor can commit a fused pair of instructions only when the latest instruction is at the head of the program order. For example, if Instruction 1 produces a value that is consumed by Instruction 2 and Instruction 3, the processor does not need to delay issuing Instruction 2 while waiting for the fused Instruction 1-Instruction 3 to execute. In situations where Instruction 3 would be ready to execute before Instruction 2, it would be beneficial to fuse Instruction 1 with Instruction 3 instead of fusing Instruction 1 with Instruction 2.

In some implementations of an out-of-order processor, a reorder buffer is used to coordinate the ordering of instructions. In an out-of-order processor, it may be easier to perform fusion in the reorder buffer. If sequential instructions are fused, the consecutive queue entries in the reorder buffer are compressed to complete the fused operations. If non-sequential instructions are being fused, the before and after cases may be presented. Whether non-sequential instructions can be fused may depend on whether one of the intervening instructions throws an exception.

In an example of parallel pipeline fusion, three instructions can be fused. In this example, four numbers are being added together: A+B+C+D. In a first step, two additions are performed: A+B and C+D. These two additions can be performed in separate pipelines by an early arithmetic logic unit (ALU). In this instance, the term "early ALU" means that the ALU is located early in the pipeline. In a second step, the results from the first step are combined: the sum A+B and the sum C+D. The second step may be performed in a late ALU; i.e., in a second ALU that is located later in the pipeline than the early ALU.

In an out-of-order processor, an instruction needs to have its data available to be able to execute (a data hazard), and the processor also needs to be able to resolve structural hazards (whether there is an available functional unit in the pipeline to perform the instruction) before the instruction can issue.

If break-pointing is enabled in the processor, fusion may be disabled, as fusing instructions may have an adverse impact on the break-pointing functionality.

In a first aspect, the subject matter described in this specification can be embodied in integrated circuits that include one or more execution resource circuitries configured to execute micro-ops to support an instruction set including macro-ops, an instruction decode buffer configured to store macro-ops fetched from memory, and an instruction decoder circuitry configured to: detect a sequence of macro-ops stored in the instruction decode buffer, the sequence of macro-ops including a first macro-op, followed by one or more intervening macro-ops, followed by a last macro-op; determine a micro-op that is equivalent to the first macro-op combined with the last macro-op; and forward the micro-op to at least one of the one or more execution resource circuitries for execution.

In the first aspect, the instruction decoder circuitry may be configured to check that the last macro-op is independent of the one or more intervening macro-ops. In the first aspect, the instruction decoder circuitry may be configured to check that the one or more intervening macro-ops can be issued in a same clock cycle as the micro-op. In the first aspect, the last macro-op may be a control flow instruction. In the first aspect, the one or more intervening macro-ops may include a conditional branch macro-op, and the integrated circuits may include a branch speculation circuitry configured to: store a pointer to the first macro-op, associated with a prediction of whether the conditional branch macro-op will be taken; and, responsive to detecting that the conditional branch macro-op has been mispredicted, flush a processor pipeline including the instruction decoder circuitry and the one or more execution resource circuitries to restart execution with the first macro-op. In the first aspect, the one or more execution resource circuitries may include an early execution resource circuitry and a late execution resource circuitry that is after the early execution resource circuitry in a processor pipeline and is configured to take output from the early execution resource circuitry as input, and the micro-op may be executed by both the early execution resource circuitry and the late execution resource circuitry. In the first aspect, the instruction decoder circuitry may be configured to determine a prediction of whether a delay caused by fusing the first macro-op with the last macro-op will be below a threshold, wherein the micro-op is determined responsive to the prediction indicating that the delay will be below the threshold. In the first aspect, the one or more execution resource circuitries may include a first execution resource circuitry in a first processor pipeline branch and a second execution resource circuitry in a second processor pipeline branch that operates in parallel with the first processor pipeline branch, and the micro-op may be executed by both the first execution resource circuitry and the second execution resource circuitry. In the first aspect, the one or more intervening macro-ops may include at least two macro-ops. In the first aspect, the one or more intervening macro-ops may consist of a number of macro-ops equal to two less than the number of macro-ops that the instruction decode buffer is sized to store. In the first aspect, the integrated circuits may include a fusion predictor circuitry configured to: detect a prefix of the sequence of macro-ops in the instruction decode buffer; determine a prediction of whether the sequence of macro-ops will be completed in a next fetch of macro-ops from memory and fused; and, based on the prediction, delay execution of the prefix until after the next fetch to enable fusion of the sequence of macro-ops. In the first aspect, the fusion predictor circuitry may be configured to maintain a table of prediction counters, wherein the table of prediction counters is used to determine the prediction. In the first aspect, the table of prediction counters may be indexed by a program counter. In the first aspect, the table of prediction counters may be tagged with program counter values. In the first aspect, the fusion predictor circuitry may be configured to update the table of prediction counters based on whether the sequence of macro-ops is completed by the next fetch of macro-ops from memory. In the first aspect, the fusion predictor circuitry may be configured to update the table of prediction counters based on whether there are instructions in the next fetch that depend on instructions in the prefix.

In a second aspect, the subject matter described in this specification can be embodied in methods that include detecting a sequence of macro-ops stored in an instruction decode buffer, the sequence of macro-ops including a first macro-op, followed by one or more intervening macro-ops, followed by a last macro-op; determining a micro-op that is equivalent to the first macro-op combined with the last macro-op; and forwarding the micro-op to one or more execution resource circuitries for execution.

In the second aspect, the methods may include checking that the last macro-op is independent of the one or more intervening macro-ops. In the second aspect, the methods may include checking that the one or more intervening macro-ops can be issued in a same clock cycle as the micro-op. In the second aspect, the last macro-op may be a control flow instruction. In the second aspect, the one or more intervening macro-ops may include a conditional branch macro-op, and the methods may include storing a pointer to the first macro-op, associated with a prediction of whether the conditional branch macro-op will be taken; and, responsive to detecting that the conditional branch macro-op has been mispredicted, flushing a processor pipeline including the one or more execution resource circuitries to restart execution with the first macro-op. In the second aspect, the one or more execution resource circuitries may include an early execution resource circuitry and a late execution resource circuitry that is after the early execution resource circuitry in a processor pipeline and is configured to take output from the early execution resource circuitry as input, and the micro-op may be executed by both the early execution resource circuitry and the late execution resource circuitry. In the second aspect, the methods may include determining a prediction of whether a delay caused by fusing the first macro-op with the last macro-op will be below a threshold, wherein the micro-op is determined responsive to the prediction indicating that the delay will be below the threshold. In the second aspect, the one or more execution resource circuitries may include a first execution resource circuitry in a first processor pipeline branch and a second execution resource circuitry in a second processor pipeline branch that operates in parallel with the first processor pipeline branch, and the micro-op may be executed by both the first execution resource circuitry and the second execution resource circuitry. In the second aspect, the one or more intervening macro-ops may include at least two macro-ops. In the second aspect, the one or more intervening macro-ops may consist of a number of macro-ops equal to two less than the number of macro-ops that the instruction decode buffer is sized to store. In the second aspect, the methods may include detecting a prefix of the sequence of macro-ops in the instruction decode buffer; determining a prediction of whether the sequence of macro-ops will be completed in a next fetch of macro-ops from memory and fused; and, based on the prediction, delaying execution of the prefix until after the next fetch to enable fusion of the sequence of macro-ops. In the second aspect, the methods may include maintaining a table of prediction counters, wherein the table of prediction counters is used to determine the prediction. In the second aspect, the table of prediction counters may be indexed by a program counter. In the second aspect, the table of prediction counters may be tagged with program counter values. In the second aspect, the methods may include updating the table of prediction counters based on whether the sequence of macro-ops is completed by the next fetch of macro-ops from memory. In the second aspect, the methods may include updating the table of prediction counters based on whether there are instructions in the next fetch that depend on instructions in the prefix.

In a third aspect, the subject matter described in this specification can be embodied in a non-transitory computer readable medium comprising a circuit representation that, when processed by a computer, is used to program or manufacture an integrated circuit including one or more execution resource circuitries configured to execute micro-ops to support an instruction set including macro-ops, an instruction decode buffer configured to store macro-ops fetched from memory, and an instruction decoder circuitry configured to: detect a sequence of macro-ops stored in the instruction decode buffer, the sequence of macro-ops including a first macro-op, followed by one or more intervening macro-ops, followed by a last macro-op; determine a micro-op that is equivalent to the first macro-op combined with the last macro-op; and forward the micro-op to at least one of the one or more execution resource circuitries for execution.

In the third aspect, the instruction decoder circuitry may be configured to check that the last macro-op is independent of the one or more intervening macro-ops. In the third aspect, the instruction decoder circuitry may be configured to check that the one or more intervening macro-ops can be issued in a same clock cycle as the micro-op. In the third aspect, the last macro-op may be a control flow instruction. In the third aspect, the one or more intervening macro-ops may include a conditional branch macro-op, and wherein the circuit representation, when processed by the computer, may be used to program or manufacture the integrated circuit comprising a branch speculation circuitry configured to: store a pointer to the first macro-op, associated with a prediction of whether the conditional branch macro-op will be taken; and, responsive to detecting that the conditional branch macro-op has been mispredicted, flush a processor pipeline including the instruction decoder circuitry and the one or more execution resource circuitries to restart execution with the first macro-op. In the third aspect, the one or more execution resource circuitries may include an early execution resource circuitry and a late execution resource circuitry that is after the early execution resource circuitry in a processor pipeline and is configured to take output from the early execution resource circuitry as input, and the micro-op may be executed by both the early execution resource circuitry and the late execution resource circuitry. In the third aspect, the instruction decoder circuitry may be configured to determine a prediction of whether a delay caused by fusing the first macro-op with the last macro-op will be below a threshold, wherein the micro-op is determined responsive to the prediction indicating that the delay will be below the threshold. In the third aspect, the one or more execution resource circuitries may include a first execution resource circuitry in a first processor pipeline branch and a second execution resource circuitry in a second processor pipeline branch that operates in parallel with the first processor pipeline branch, and the micro-op may be executed by both the first execution resource circuitry and the second execution resource circuitry. In the third aspect, the one or more intervening macro-ops may include at least two macro-ops. In the third aspect, the one or more intervening macro-ops may consist of a number of macro-ops equal to two less than the number of macro-ops that the instruction decode buffer is sized to store. In the third aspect, the integrated circuit may include a fusion predictor circuitry configured to: detect a prefix of the sequence of macro-ops in the instruction decode buffer; determine a prediction of whether the sequence of macro-ops will be completed in a next fetch of macro-ops from memory and fused; and, based on the prediction, delay execution of the prefix until after the next fetch to enable fusion of the sequence of macro-ops. In the third aspect, the fusion predictor circuitry may be configured to maintain a table of prediction counters, wherein the table of prediction counters is used to determine the prediction. In the third aspect, the table of prediction counters may be indexed by a program counter. In the third aspect, the table of prediction counters may be tagged with program counter values. In the third aspect, the fusion predictor circuitry may be configured to update the table of prediction counters based on whether the sequence of macro-ops is completed by the next fetch of macro-ops from memory. In the third aspect, the fusion predictor circuitry may be configured to update the table of prediction counters based on whether there are instructions in the next fetch that depend on instructions in the prefix.

In a fourth aspect, the subject matter described in this specification can be embodied in integrated circuits that include one or more execution resource circuitries configured to execute micro-ops to support an instruction set including macro-ops, an instruction decode buffer configured to store macro-ops fetched from memory, and an instruction decoder circuitry configured to: detect a sequence of macro-ops stored in the instruction decode buffer, the sequence of macro-ops including a first macro-op followed by a last macro-op; determine a micro-op that is equivalent to the first macro-op combined with the last macro-op; and forward the micro-op to at least one of the one or more execution resource circuitries for execution, in which the one or more execution resource circuitries include an early execution resource circuitry and a late execution resource circuitry that is after the early execution resource circuitry in a processor pipeline and is configured to take output from the early execution resource circuitry as input, and in which the micro-op is executed by both the early execution resource circuitry and the late execution resource circuitry.

In the fourth aspect, the instruction decoder circuitry may be configured to determine a prediction of whether a delay caused by fusing the first macro-op with the last macro-op will be below a threshold, wherein the micro-op may be determined responsive to the prediction indicating that the delay will be below the threshold. In the fourth aspect, the integrated circuits may include a fusion predictor circuitry configured to: detect a prefix of the sequence of macro-ops in the instruction decode buffer; determine a prediction of whether the sequence of macro-ops will be completed in a next fetch of macro-ops from memory and fused; and, based on the prediction, delay execution of the prefix until after the next fetch to enable fusion of the sequence of macro-ops. In the fourth aspect, the fusion predictor circuitry may be configured to maintain a table of prediction counters, wherein the table of prediction counters may be used to determine the prediction.

In a fifth aspect, the subject matter described in this specification can be embodied in methods that include detecting a sequence of macro-ops stored in an instruction decode buffer, the sequence of macro-ops including a first macro-op followed by a last macro-op; determining a micro-op that is equivalent to the first macro-op combined with the last macro-op; and forwarding the micro-op to one or more execution resource circuitries for execution, in which the one or more execution resource circuitries include an early execution resource circuitry and a late execution resource circuitry that is after the early execution resource circuitry in a processor pipeline and is configured to take output from the early execution resource circuitry as input, and in which the micro-op is executed by both the early execution resource circuitry and the late execution resource circuitry.

In the fifth aspect, the methods may include determining a prediction of whether a delay caused by fusing the first macro-op with the last macro-op will be below a threshold, wherein the micro-op is determined responsive to the prediction indicating that the delay will be below the threshold. In the fifth aspect, the methods may include detecting a prefix of the sequence of macro-ops in the instruction decode buffer; determining a prediction of whether the sequence of macro-ops will be completed in a next fetch of macro-ops from memory and fused; and, based on the prediction, delaying execution of the prefix until after the next fetch to enable fusion of the sequence of macro-ops. In the fifth aspect, the methods may include maintaining a table of prediction counters, wherein the table of prediction counters is used to determine the prediction.

In a sixth aspect, the subject matter described in this specification can be embodied in a non-transitory computer readable medium comprising a circuit representation that, when processed by a computer, is used to program or manufacture an integrated circuit including one or more execution resource circuitries configured to execute micro-ops to support an instruction set including macro-ops, an instruction decode buffer configured to store macro-ops fetched from memory, and an instruction decoder circuitry configured to: detect a sequence of macro-ops stored in the instruction decode buffer, the sequence of macro-ops including a first macro-op followed by a last macro-op; determine a micro-op that is equivalent to the first macro-op combined with the last macro-op; and forward the micro-op to at least one of the one or more execution resource circuitries for execution, in which the one or more execution resource circuitries include an early execution resource circuitry and a late execution resource circuitry that is after the early execution resource circuitry in a processor pipeline and is configured to take output from the early execution resource circuitry as input, and in which the micro-op is executed by both the early execution resource circuitry and the late execution resource circuitry.

In the sixth aspect, the instruction decoder circuitry may be configured to determine a prediction of whether a delay caused by fusing the first macro-op with the last macro-op will be below a threshold, wherein the micro-op may be determined responsive to the prediction indicating that the delay will be below the threshold. In the sixth aspect, the integrated circuit may include a fusion predictor circuitry configured to: detect a prefix of the sequence of macro-ops in the instruction decode buffer; determine a prediction of whether the sequence of macro-ops will be completed in a next fetch of macro-ops from memory and fused; and, based on the prediction, delay execution of the prefix until after the next fetch to enable fusion of the sequence of macro-ops. In the sixth aspect, the fusion predictor circuitry may be configured to maintain a table of prediction counters, wherein the table of prediction counters is used to determine the prediction.

In a seventh aspect, the subject matter described in this specification can be embodied in integrated circuits that include one or more execution resource circuitries configured to execute micro-ops to support an instruction set including macro-ops, an instruction decode buffer configured to store macro-ops fetched from memory, and an instruction decoder circuitry configured to: detect a sequence of macro-ops stored in the instruction decode buffer, the sequence of macro-ops including a first macro-op followed by a last macro-op; determine a micro-op that is equivalent to the first macro-op combined with the last macro-op; and forward the micro-op to at least one of the one or more execution resource circuitries for execution, in which the one or more execution resource circuitries include a first execution resource circuitry in a first processor pipeline branch and a second execution resource circuitry in a second processor pipeline branch that operates in parallel with the first processor pipeline branch, and in which the micro-op is executed by both the first execution resource circuitry and the second execution resource circuitry.

In the seventh aspect, the instruction decoder circuitry may be configured to determine a prediction of whether a delay caused by fusing the first macro-op with the last macro-op will be below a threshold, wherein the micro-op may be determined responsive to the prediction indicating that the delay will be below the threshold. In the seventh aspect, the integrated circuits may include a fusion predictor circuitry configured to: detect a prefix of the sequence of macro-ops in the instruction decode buffer; determine a prediction of whether the sequence of macro-ops will be completed in a next fetch of macro-ops from memory and fused; and, based on the prediction, delay execution of the prefix until after the next fetch to enable fusion of the sequence of macro-ops. In the seventh aspect, the fusion predictor circuitry may be configured to maintain a table of prediction counters, wherein the table of prediction counters is used to determine the prediction.

In an eighth aspect, the subject matter described in this specification can be embodied in methods that include detecting a sequence of macro-ops stored in an instruction decode buffer, the sequence of macro-ops including a first macro-op followed by a last macro-op; determining a micro-op that is equivalent to the first macro-op combined with the last macro-op; and forwarding the micro-op to one or more execution resource circuitries for execution, in which the one or more execution resource circuitries include a first execution resource circuitry in a first processor pipeline branch and a second execution resource circuitry in a second processor pipeline branch that operates in parallel with the first processor pipeline branch, and in which the micro-op is executed by both the first execution resource circuitry and the second execution resource circuitry.

In the eighth aspect, the methods may include determining a prediction of whether a delay caused by fusing the first macro-op with the last macro-op will be below a threshold, wherein the micro-op is determined responsive to the prediction indicating that the delay will be below the threshold. In the eighth aspect, the methods may include detecting a prefix of the sequence of macro-ops in the instruction decode buffer; determining a prediction of whether the sequence of macro-ops will be completed in a next fetch of macro-ops from memory and fused; and, based on the prediction, delaying execution of the prefix until after the next fetch to enable fusion of the sequence of macro-ops. In the eighth aspect, the methods may include maintaining a table of prediction counters, wherein the table of prediction counters is used to determine the prediction.

In a ninth aspect, the subject matter described in this specification can be embodied in a non-transitory computer readable medium comprising a circuit representation that, when processed by a computer, is used to program or manufacture an integrated circuit including one or more execution resource circuitries configured to execute micro-ops to support an instruction set including macro-ops, an instruction decode buffer configured to store macro-ops fetched from memory, and an instruction decoder circuitry configured to: detect a sequence of macro-ops stored in the instruction decode buffer, the sequence of macro-ops including a first macro-op followed by a last macro-op; determine a micro-op that is equivalent to the first macro-op combined with the last macro-op; and forward the micro-op to at least one of the one or more execution resource circuitries for execution, in which the one or more execution resource circuitries include a first execution resource circuitry in a first processor pipeline branch and a second execution resource circuitry in a second processor pipeline branch that operates in parallel with the first processor pipeline branch, and in which the micro-op is executed by both the first execution resource circuitry and the second execution resource circuitry.

In the ninth aspect, the instruction decoder circuitry may be configured to determine a prediction of whether a delay caused by fusing the first macro-op with the last macro-op will be below a threshold, wherein the micro-op is determined responsive to the prediction indicating that the delay will be below the threshold. In the ninth aspect, the integrated circuit may include a fusion predictor circuitry configured to: detect a prefix of the sequence of macro-ops in the instruction decode buffer; determine a prediction of whether the sequence of macro-ops will be completed in a next fetch of macro-ops from memory and fused; and, based on the prediction, delay execution of the prefix until after the next fetch to enable fusion of the sequence of macro-ops. In the ninth aspect, the fusion predictor circuitry may be configured to maintain a table of prediction counters, wherein the table of prediction counters is used to determine the prediction.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An integrated circuit comprising:
   one or more execution resource circuitries configured to execute micro-ops to support an instruction set including macro-ops,
   an instruction decode buffer configured to store macro-ops fetched from memory, and
   an instruction decoder circuitry configured to:
      detect a sequence of macro-ops stored in the instruction decode buffer, the sequence of macro-ops including a first macro-op, followed by one or more intervening macro-ops, followed by a last macro-op, wherein the one or more intervening macro-ops include a conditional branch macro-op;
      determine a micro-op that is equivalent to the first macro-op combined with the last macro-op; and
      forward the micro-op to at least one of the one or more execution resource circuitries for execution.

2. The integrated circuit of claim 1, in which the instruction decoder circuitry is configured to:
   check that the last macro-op is independent of the one or more intervening macro-ops.

3. The integrated circuit of claim 1, in which the instruction decoder circuitry is configured to:
   check that the one or more intervening macro-ops can be issued in a same clock cycle as the micro-op.

4. The integrated circuit of claim 1, in which the last macro-op is a control flow instruction.

5. The integrated circuit of claim 1, further comprising a branch speculation circuitry configured to:
   store a pointer to the first macro-op, associated with a prediction of whether the conditional branch macro-op will be taken; and
   responsive to detecting that the conditional branch macro-op has been mispredicted, flush a processor pipeline including the instruction decoder circuitry and the one or more execution resource circuitries to restart execution with the first macro-op.

6. The integrated circuit of claim 1, in which the one or more execution resource circuitries include an early execution resource circuitry and a late execution resource circuitry that is after the early execution resource circuitry in a processor pipeline and is configured to take output from the early execution resource circuitry as input, and in which the micro-op is executed by both the early execution resource circuitry and the late execution resource circuitry.

7. The integrated circuit of claim 6, in which the instruction decoder circuitry is configured to:
   determine a prediction of whether a delay caused by fusing the first macro-op with the last macro-op will be below a threshold, wherein the micro-op is determined responsive to the prediction indicating that the delay will be below the threshold.

8. The integrated circuit of claim 1, in which the one or more execution resource circuitries include a first execution resource circuitry in a first processor pipeline branch and a second execution resource circuitry in a second processor pipeline branch that operates in parallel with the first processor pipeline branch, and in which the micro-op is executed by both the first execution resource circuitry and the second execution resource circuitry.

9. The integrated circuit of claim 1, in which the one or more intervening macro-ops include at least two macro-ops.

10. The integrated circuit of claim 1, in which the one or more intervening macro-ops consist of a number of macro-ops equal to two less than the number of macro-ops that the instruction decode buffer is sized to store.

11. The integrated circuit of claim 1, comprising a fusion predictor circuitry configured to:
    detect a prefix of the sequence of macro-ops in the instruction decode buffer;
    determine a prediction of whether the sequence of macro-ops will be completed in a next fetch of macro-ops from memory and fused; and
    based on the prediction, delay execution of the prefix until after the next fetch to enable fusion of the sequence of macro-ops.

12. The integrated circuit of claim 11, in which the fusion predictor circuitry is configured to: maintain a table of prediction counters, wherein the table of prediction counters is used to determine the prediction.

13. The integrated circuit of claim 12, in which the fusion predictor circuitry is configured to update the table of prediction counters based on whether there are instructions in the next fetch that depend on instructions in the prefix.

14. A method comprising:
    detecting a sequence of macro-ops stored in an instruction decode buffer, the sequence of macro-ops including a first macro-op, followed by one or more intervening macro-ops, followed by a last macro-op, wherein the one or more intervening macro-ops include a conditional branch macro-op;
    determining a micro-op that is equivalent to the first macro-op combined with the last macro-op; and
    forwarding the micro-op to one or more execution resource circuitries for execution.

15. The method of claim 14, further comprising:
    storing a pointer to the first macro-op, associated with a prediction of whether the conditional branch macro-op will be taken; and
    responsive to detecting that the conditional branch macro-op has been mispredicted, flushing a processor pipeline including the one or more execution resource circuitries to restart execution with the first macro-op.

16. The method of claim 14, in which the one or more execution resource circuitries include an early execution resource circuitry and a late execution resource circuitry that is after the early execution resource circuitry in a processor pipeline and is configured to take output from the early execution resource circuitry as input, and in which the micro-op is executed by both the early execution resource circuitry and the late execution resource circuitry.

17. The method of claim 14, comprising:
   determining a prediction of whether a delay caused by fusing the first macro-op with the last macro-op will be below a threshold, wherein the micro-op is determined responsive to the prediction indicating that the delay will be below the threshold.

18. The method of claim 14, in which the one or more execution resource circuitries include a first execution resource circuitry in a first processor pipeline branch and a second execution resource circuitry in a second processor pipeline branch that operates in parallel with the first processor pipeline branch, and in which the micro-op is executed by both the first execution resource circuitry and the second execution resource circuitry.

19. The method of claim 14, comprising:
   detecting a prefix of the sequence of macro-ops in the instruction decode buffer;
   determining a prediction of whether the sequence of macro-ops will be completed in a next fetch of macro-ops from memory and fused; and
   based on the prediction, delaying execution of the prefix until after the next fetch to enable fusion of the sequence of macro-ops.

20. A non-transitory computer readable medium comprising a circuit representation that, when processed by a computer, is used to program or manufacture an integrated circuit comprising:
   one or more execution resource circuitries configured to execute micro-ops to support an instruction set including macro-ops,
   an instruction decode buffer configured to store macro-ops fetched from memory, and
   an instruction decoder circuitry configured to:
      detect a sequence of macro-ops stored in the instruction decode buffer, the sequence of macro-ops including a first macro-op, followed by one or more intervening macro-ops, followed by a last macro-op, wherein the one or more intervening macro-ops include a conditional branch macro-op;
      determine a micro-op that is equivalent to the first macro-op combined with the last macro-op; and
      forward the micro-op to at least one of the one or more execution resource circuitries for execution.

* * * * *